US012189219B2

United States Patent
Hu et al.

(10) Patent No.: US 12,189,219 B2
(45) Date of Patent: Jan. 7, 2025

(54) OPTICAL DEVICES WITH PHASE-CHANGE MATERIALS

(71) Applicant: Massachusetts Institute of Technology, Cambridge, MA (US)

(72) Inventors: Juejun Hu, Newton, MA (US); Tian Gu, Fairfax, VA (US); Yifei Zhang, Cambridge, MA (US); Carlos Andres Rios Ocampo, Somerville, MA (US); Mikhail Shalaginov, Somerville, MA (US); Xiaoming Qiu, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 722 days.

(21) Appl. No.: 17/183,267

(22) Filed: Feb. 23, 2021

(65) Prior Publication Data
US 2021/0333575 A1    Oct. 28, 2021

Related U.S. Application Data

(60) Provisional application No. 63/014,161, filed on Apr. 23, 2020.

(51) Int. Cl.
    *G02F 1/01*    (2006.01)
(52) U.S. Cl.
    CPC ........ *G02F 1/0147* (2013.01); *G02F 2202/30* (2013.01); *G02F 2203/69* (2013.01)
(58) Field of Classification Search
    CPC .. G02F 1/01708; G02F 1/0157; G02F 1/0155; G02F 1/0151; G02F 1/015; G02F 1/0147
    See application file for complete search history.

(56) References Cited

U.S. PATENT DOCUMENTS

| | | |
|---|---|---|
| 2003/0057428 A1 | 3/2003 | Day |
| 2006/0140535 A1 | 6/2006 | Tsuda et al. |
| 2014/0376851 A1 | 12/2014 | Akiyama |
| 2016/0356708 A1 | 12/2016 | Bennett et al. |
| 2017/0023736 A1 | 1/2017 | Bauters et al. |
| 2018/0284492 A1 | 10/2018 | Fang et al. |

(Continued)

FOREIGN PATENT DOCUMENTS

WO    2019102183 A1    5/2019

OTHER PUBLICATIONS

International Search Report and Written Opinion in International Patent Application No. PCT/US2021/019292 mailed Jun. 23, 2021, 21 pages.

(Continued)

*Primary Examiner* — Christopher Stanford
*Assistant Examiner* — Journey F Sumlar
(74) *Attorney, Agent, or Firm* — Smith Baluch LLP

(57) ABSTRACT

Reversible phase-change materials (PCMs) can be added to or incorporated into meta-lenses, wave plates, waveguides, gratings, and other optical components to form active optical devices with controllable and adjustable optical characteristics. Local heating can be used to induce solid-state phase changes and large refractive index changes in the PCMs. The phase and index changes can provide large changes in the device's optical characteristics. Optical devices with PCM can be used for imaging applications, orbital angular momentum control, photonic integrated circuits and optical communication systems, beam steering, and other application.

32 Claims, 15 Drawing Sheets

(56) References Cited

U.S. PATENT DOCUMENTS

2018/0292644 A1 10/2018 Kamali et al.
2019/0187061 A1 6/2019 Han et al.
2019/0235228 A1 8/2019 Chou et al.
2019/0253776 A1 8/2019 Mazed et al.
2019/0257984 A1 8/2019 She et al.
2019/0339585 A1 11/2019 Heck et al.
2020/0073029 A1 3/2020 Han et al.

OTHER PUBLICATIONS

Ríos et al., "Ultra-compact nonvolatile photonics based on electrically reprogrammable transparent phase change materials." arXiv preprint arXiv:2105.06010 (2021). 13 pages.

Shalaginov et al., "Reconfigurable all-dielectric metalens with diffraction-limited performance." Nature communications 12.1 (2021): 1-8.

Zhang et al., "Broadband nonvolatile photonic switching based on optical phase change materials: beyond the classical figure-of-merit." Optics letters 43.1 (2018): 94-97.

Zhang et al., "Broadband transparent optical phase change materials for high-performance nonvolatile photonics." Nature communications 10.1 (2019): 1-9.

Zhang et al., "Electrically reconfigurable non-volatile metasurface using low-loss optical phase-change material." Nature Nanotechnology 16.6 (2021): 661-666.

Zhang et al., "Transient tap couplers for wafer-level photonic testing based on optical phase change materials." ACS Photonics 8.7 (2021): 1903-1908.

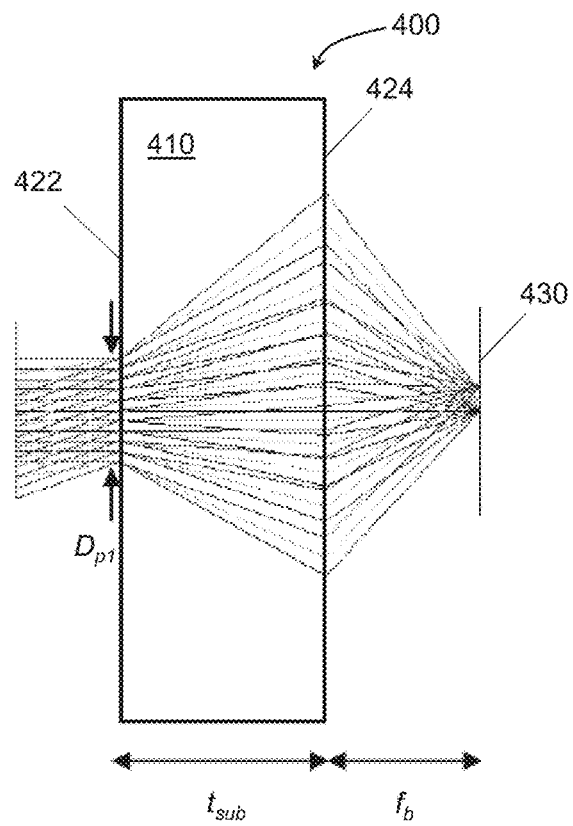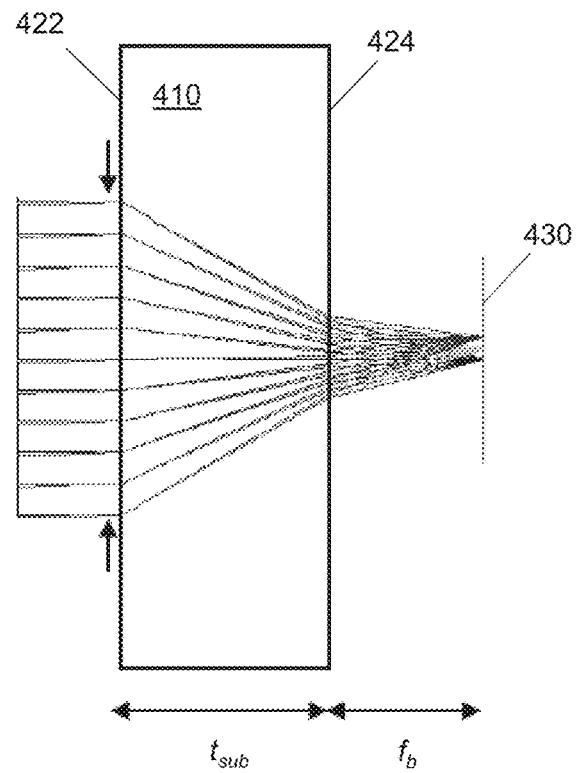
FIG. 4A
FIG. 4B
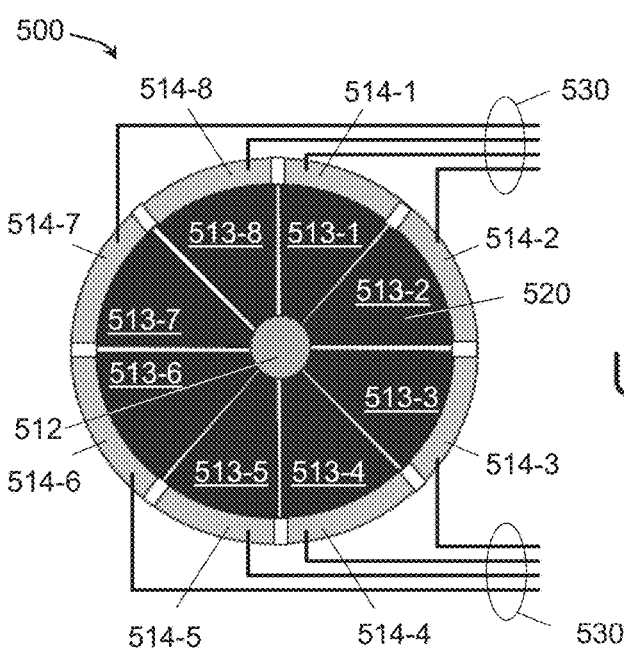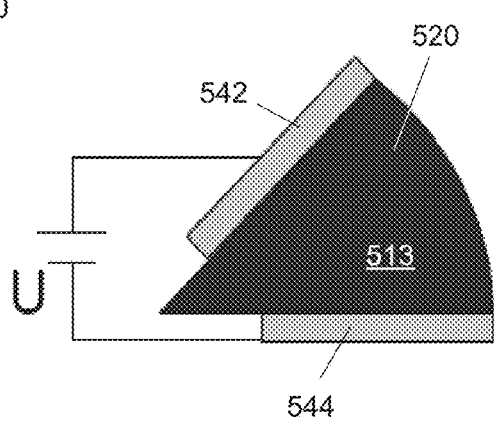
FIG. 5A
FIG. 5B l=-2 l=-1 l=+1 l=+2

OPTICAL DEVICES WITH PHASE-CHANGE MATERIALS

CROSS-REFERENCE TO RELATED APPLICATION

The present application claims a priority benefit, under 35 U.S.C. § 119(e), to U.S. Application No. 63/014,161, filed on Apr. 23, 2020 and entitled "Optical Devices Based on Phase-change materials," which application is incorporated herein by reference in its entirety.

GOVERNMENT SUPPORT

This invention was made with government support under HR0011-17-2-0029 awarded by the Defense Advanced Research Projects Agency. The government has certain rights in the invention.

BACKGROUND

Many conventional optical components (such as lenses, waveguides, and gratings) are static devices. For example, a lens may be designed to have a desired, fixed focal length for a particular wavelength of radiation that will be focused by the lens. A waveguide on a photonic integrated circuit may be designed to have a single-mode profile and optical path length for a particular wavelength coupled into the waveguide or may be designed to couple evanescently to a second waveguide in order to transfer radiation at a particular wavelength to or from the second waveguide. A grating may be designed to diffract a particular wavelength at a desired angle. Once fabricated, the optical characteristics of these devices may not change, or change slightly with temperature (which often is not desired), or in the case of an electro-active photonic waveguide change with injection of carriers. However, with changes in carrier concentration, the refractive index of the waveguide typically changes by small amounts (e.g., up to 1%).

SUMMARY

The described implementations relate to optical devices that include optical phase-change materials (PCMs). The PCMs can undergo a reversible phase change between a crystalline state and amorphous state or an intermediate state when heated. A large change in the refractive index of the PCM can accompany the phase change. Refractive index changes of up to 50% or higher are possible. The PCMs can be deposited on or incorporated into optical components to create optical devices with controllable and adjustable optical characteristics.

Some implementations relate to a tunable meta-lens comprising a substrate, an array of meta-atoms formed of phase-change material and disposed on the substrate, and a heater. The heater is in thermal communication with the array of meta-atoms to heat the array of meta-atoms and thereby change the phase-change material between an amorphous state with a first refractive index and a crystalline state with a second refractive index. The second refractive index value can be higher than the first refractive index value by at least 0.1. Intermediate states, having a portion or portions of the PCM in the crystalline phase and at least one other portion of the PCM in the amorphous phase, with intermediate refractive indices are possible and multi-state operation can also be utilized. The change between the amorphous state and the crystalline state or an intermediate state can change a focal length of the tunable meta-lens, local transmittance of an optical component (e.g., a variable aperture), beam-steering angle of a beam deflector, polarization responses of a polarization-sensitive device, etc. In some cases, the heater may additionally or alternatively be in optical communication with the array of meta-atoms so that the heater can optically contribute to the light-matter interaction (e.g., the refractive index and shape of the heating element, or portion thereof, can contribute to operating on the wavefront of radiation passing through one or more meta-atoms and the heating element, or portion thereof).

Some implementations relate to a method of testing a photonic integrated circuit (PIC). The PIC can include a first waveguide evanescently coupled to a second waveguide coated with a layer of phase-change material reversibly switchable between an amorphous state with a first refractive index and a crystalline state with a second refractive index. The second refractive index can have a value higher than the first refractive index by at least 0.1. The method can include acts of: coupling light into the first waveguide; switching the layer of phase-change material between the amorphous state and the crystalline state to increase a coupling ratio from the first waveguide to the second waveguide; detecting light coupled into the second waveguide from the first waveguide; and switching the layer of phase-change material between the crystalline state and the amorphous state to decrease the coupling ratio from the first waveguide to the second waveguide. Intermediate states with intermediate refractive indices can also be utilized.

Some implementations relate to an apparatus comprising a substrate, a waveguide integrated with the substrate, a layer of optical phase-change material disposed on the waveguide, and a doped silicon heater, integrated with the substrate, to heat the layer of optical phase-change material, thereby switching the layer of optical phase-change material between an amorphous phase and a crystalline phase.

Some implementations relate to a method of making a tunable optical grating. The method can include acts of: depositing a layer of phase-change material on a substrate; etching optical grating pattern into the layer of optical phase-change material to form grating teeth separated by spaces; and forming electrodes on opposite sides of the grating teeth.

Some implementations relate to structured and/or pixelated micro-heaters. The micro-heaters can be in thermal and/or optical communication with optical components (e.g., meta-atoms or waveguides) that include or are formed from PCM. A micro-heater that is in optical communication with an optical component may form part of the optical structure of the optical component. The micro-heaters can be controlled to create a desired thermal distribution in the PCM and to control an optical characteristic of the optical component.

Some implementations relate to an optical element that includes a substrate having a surface and a first meta-atom formed from a first material on the surface of the substrate. The first meta-atom can have a first three-dimensional structure with at least one maximum transverse dimension, in a direction parallel to the surface of the substrate, less than a wavelength of light for which the optical element is designed to operate on. The optical element can further include a first phase change material adjacent to the first material of the first meta-atom and a first heating element to heat the first phase change material thereby changing the first phase-change material, at least in part, between an amorphous state with a first refractive index and a crystalline state with a second refractive index different from the first refractive index by at least 0.1.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

FIG. 2A and FIG. 2B depict control and adjustment of the focal length of a meta-lens having PCMs.

FIG. 3D, FIG. 3E, FIG. 3F, FIG. 3G, FIG. 3H, and FIG. 3I depict additional meta-atom structures that include PCM.

FIG. 4A and FIG. 4B depict control and adjustment of a zoom lens formed on a single substrate with two meta-surfaces having meta-atoms with PCM.

FIG. 5A depicts an example of an optically active waveplate incorporating PCM.

FIG. 5B depicts an alternative arrangement for electrodes on a section of the waveplate of FIG. 5A.

Figure 5C:
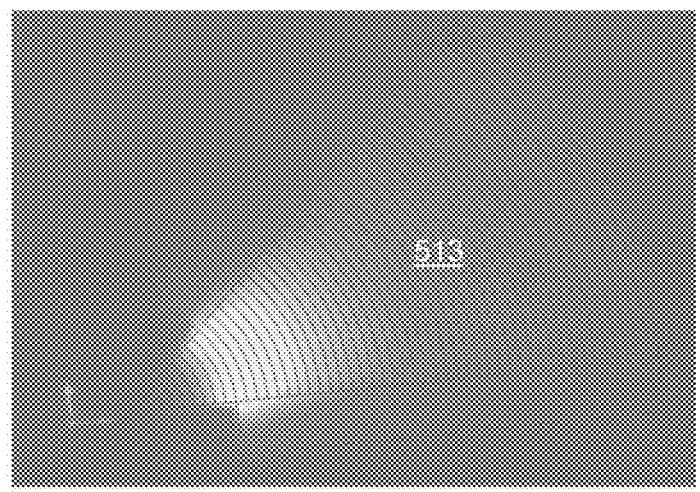

FIG. 5C depicts non-uniform heating in a section of waveplate depicted in FIG. 5B.

Figure 5D:
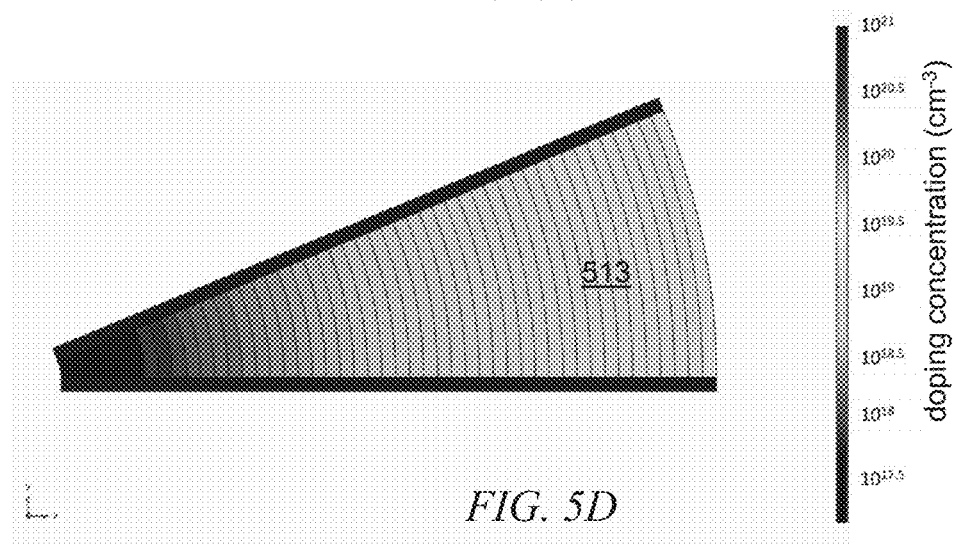

FIG. 5D depicts non-uniform doping in a section of waveplate depicted in FIG. 5B.

Figure 5E:
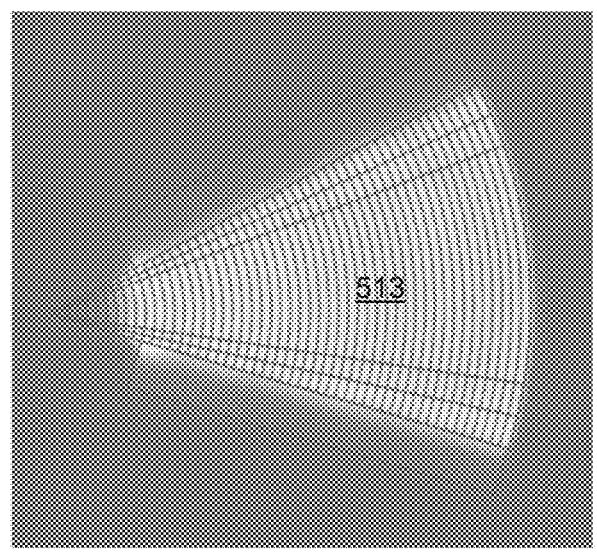

FIG. 5E depicts uniform heating in a section of waveplate depicted in FIG. 5B.

Figure 6A:
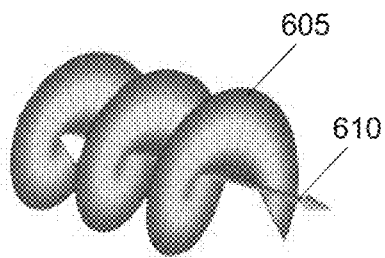
Figure 6B:
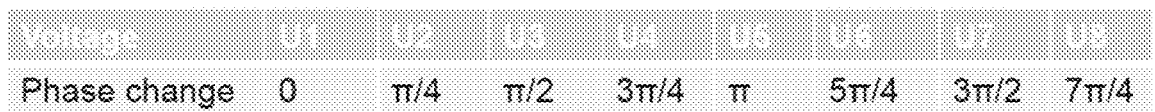
Figure 6B:
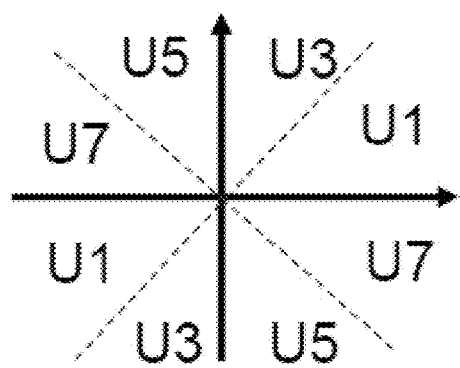
Figure 6C:
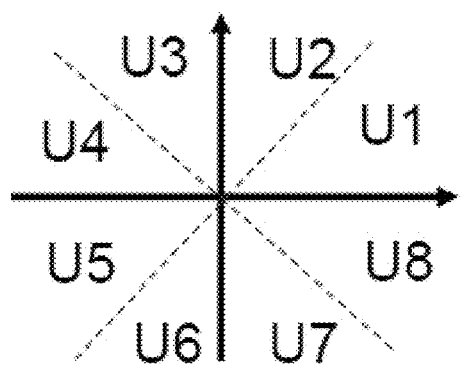
Figure 6D:
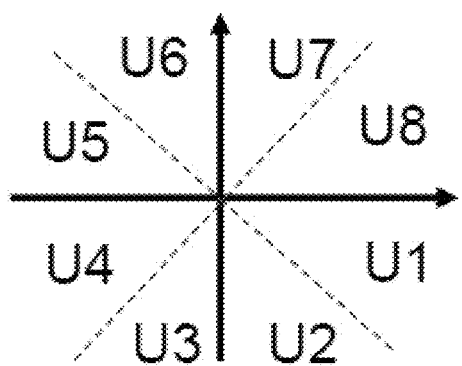
Figure 6E:
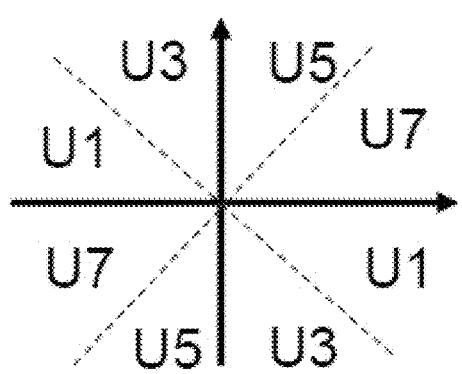

FIG. 6A illustrates a helical wavefront of an optical beam having orbital angular momentum (OAM).

FIG. 6B, FIG. 6C, FIG. 6D, and FIG. 6E depict applied voltages to sections of the active waveplate of FIG. 5A that can impart different orbital angular momentum values to an optical beam passing through the waveplate.

Figure 7:
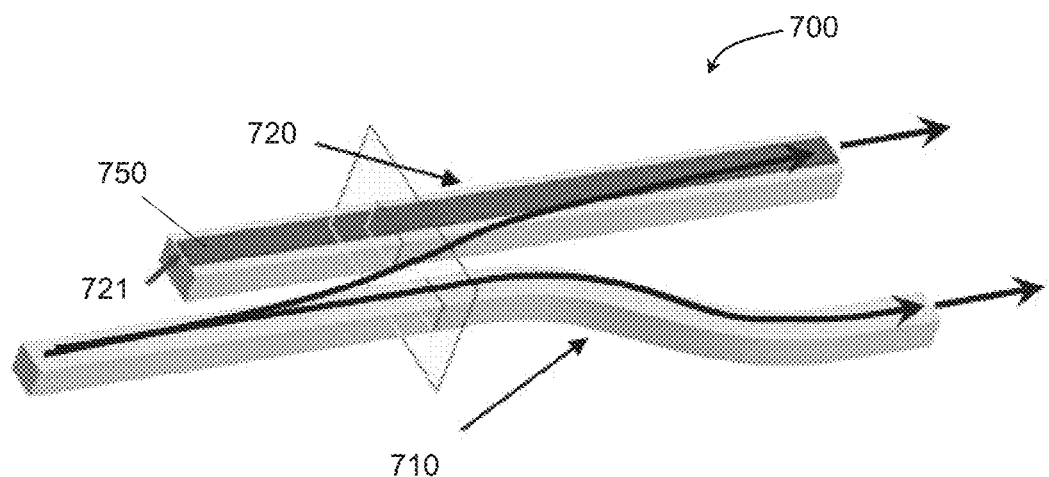

FIG. 7 illustrates an example of an active waveguide coupler that includes a PCM to change an optical coupling strength between two evanescently coupled waveguides.

Figure 8:
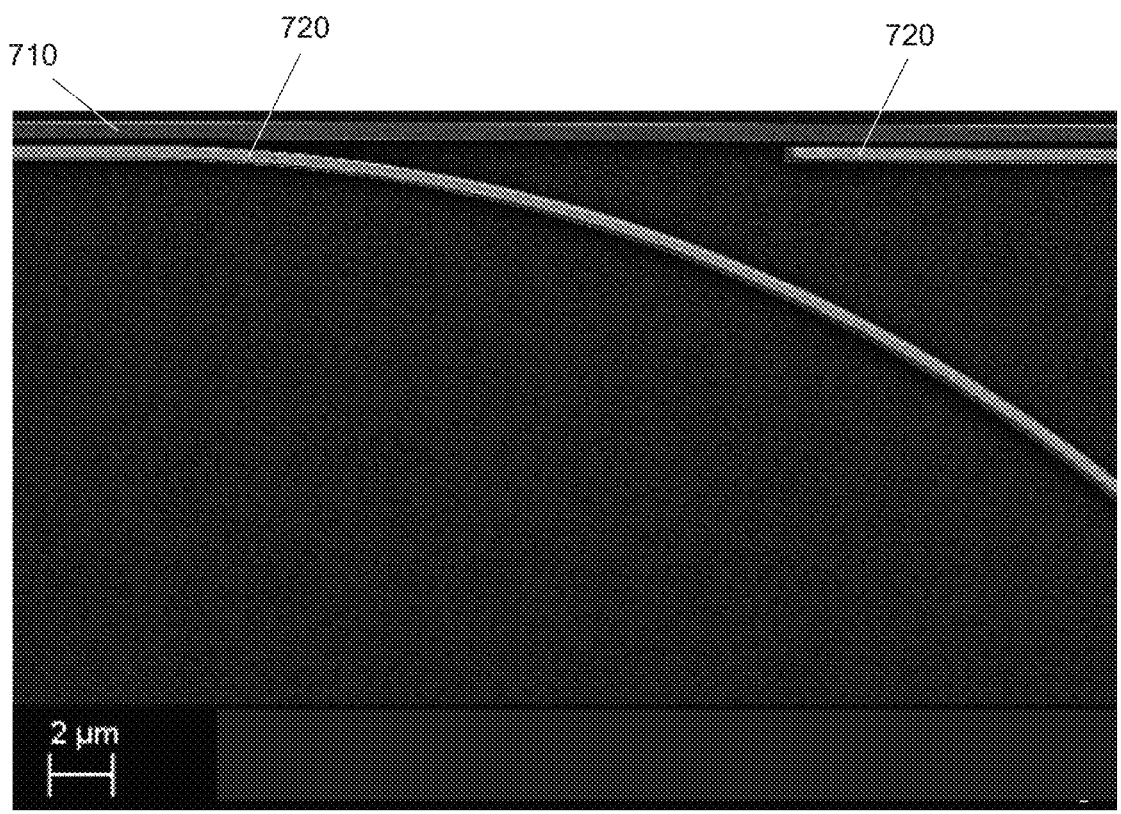

FIG. 8 is a scanning-electron micrograph showing a main waveguide coupled to two tap waveguides that include PCM.

Figure 9:
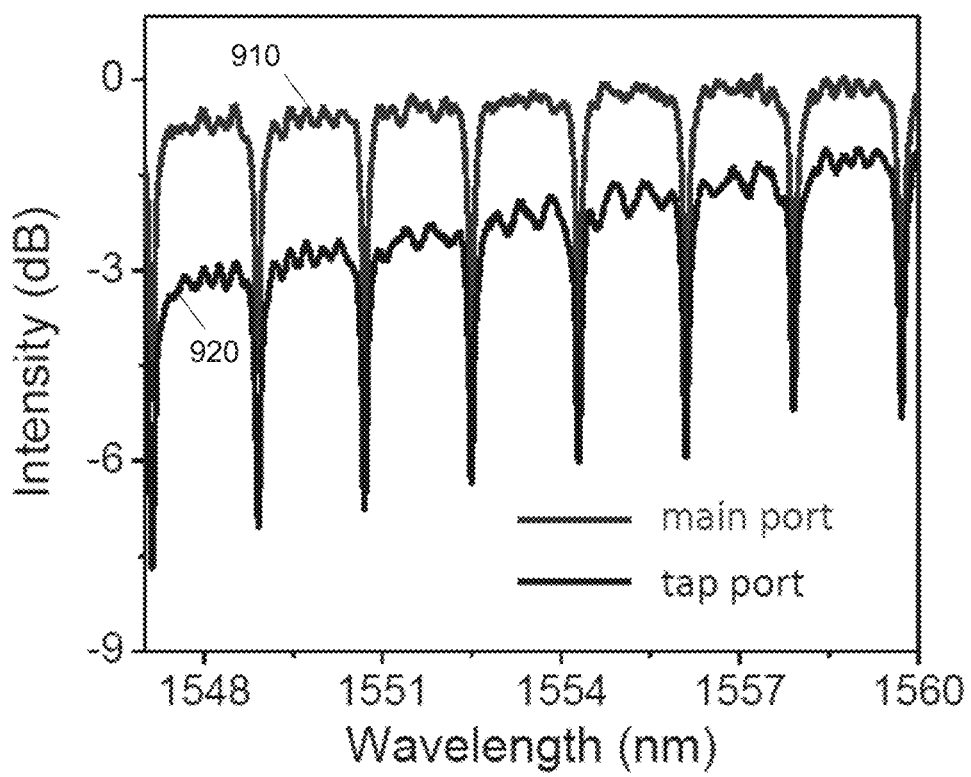

FIG. 9 plots transmitted intensity as a function of wavelength for the main waveguide and a tap waveguide of FIG. 8.

Figure 10:
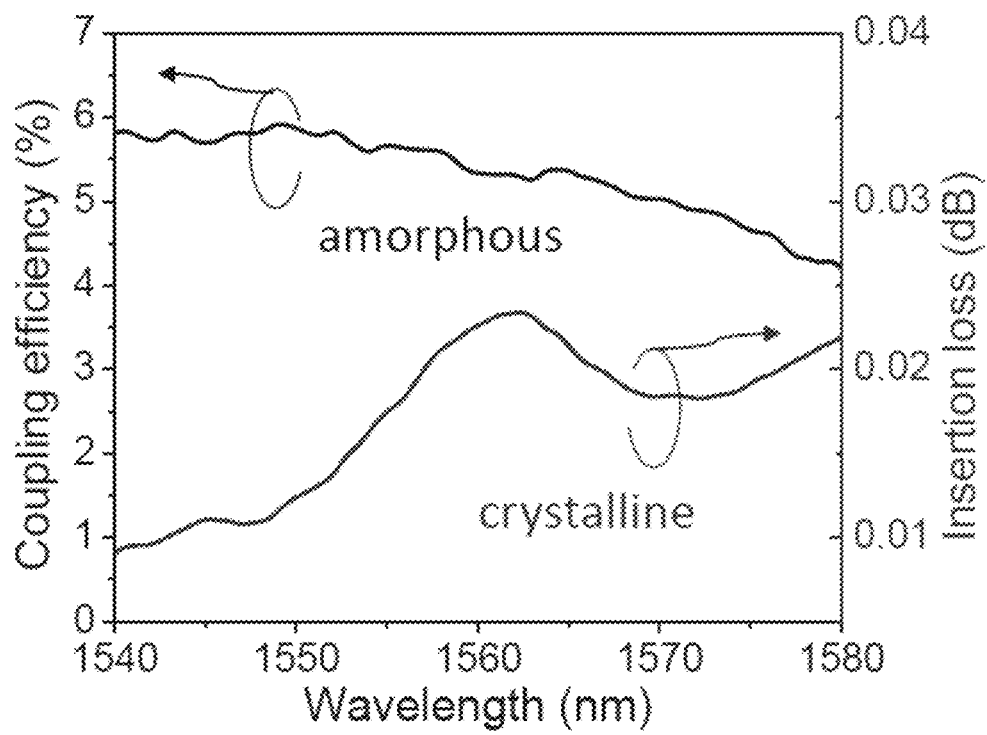

FIG. 10 plots, as a function of wavelength, coupling efficiency into a tap waveguide having PCM in an amorphous state and insertion loss measured through the main waveguide when the tap waveguide is in a crystalline state for an active waveguide coupler of FIG. 8.

Figure 11:
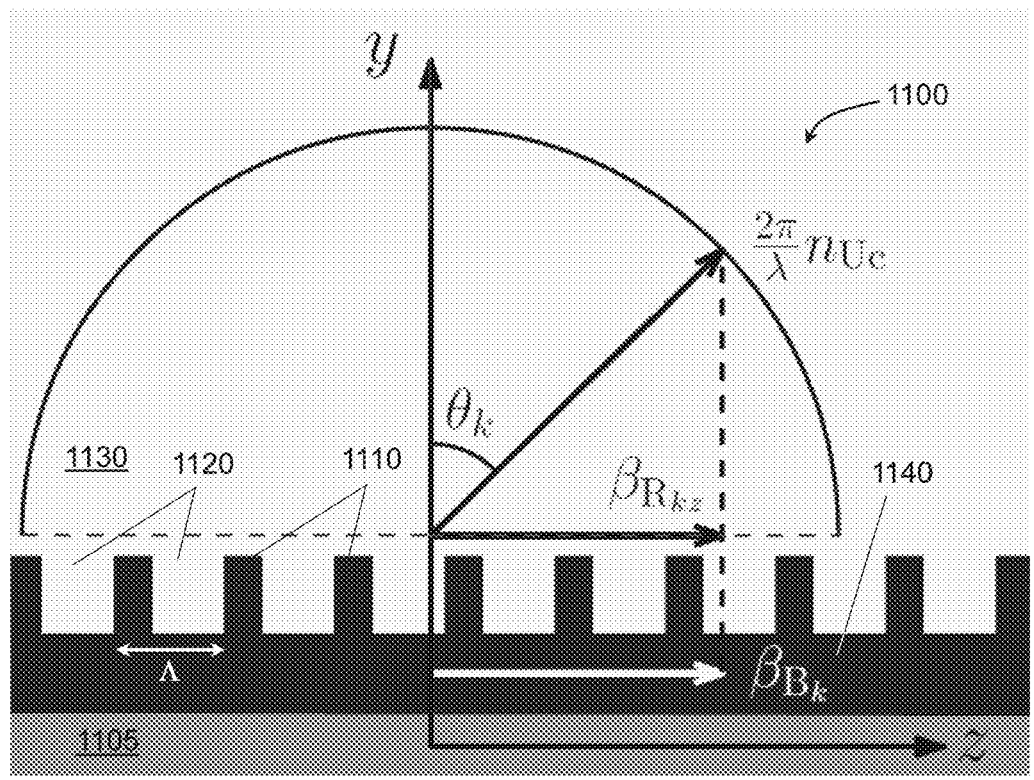

FIG. 11 depicts a portion of a grating coupler.

Figure 12A:
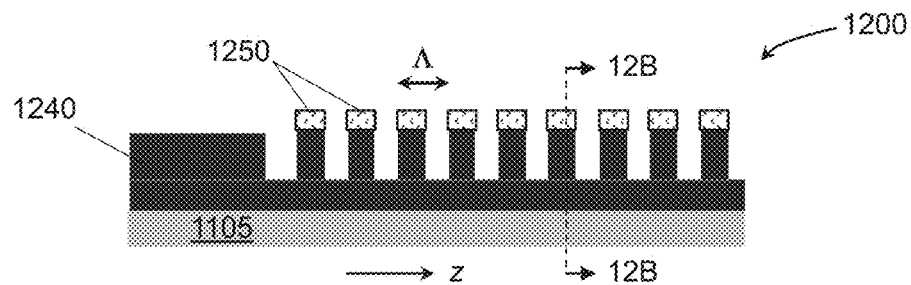

FIG. 12A depicts a portion of an active grating coupler that includes PCM.

Figure 12B:
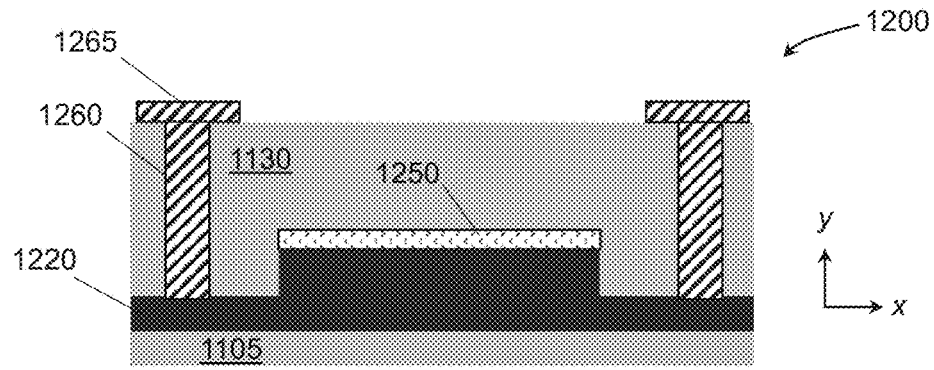

FIG. 12B depicts a cross-section of the grating coupler of FIG. 12A further processed to include conductive vias and contact pads.

Figure 13A:
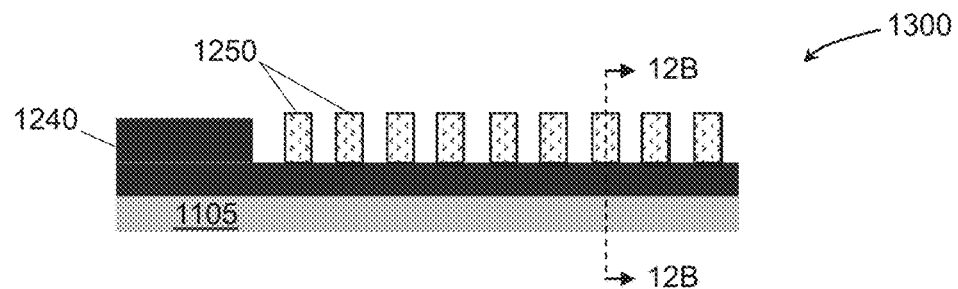

FIG. 13A depicts a portion of another active grating coupler for which the teeth of the grating are formed from PCM.

Figure 13B:
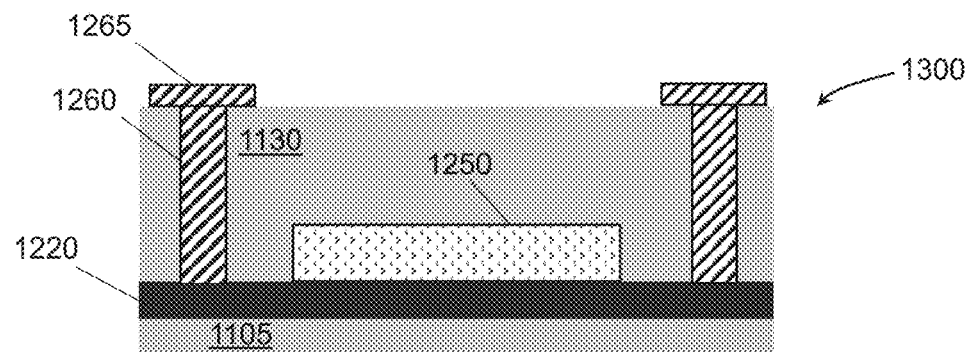

FIG. 13B depicts a cross-section of the grating coupler of FIG. 13A further processed to include conductive vias and contact pads.

Figure 14A:
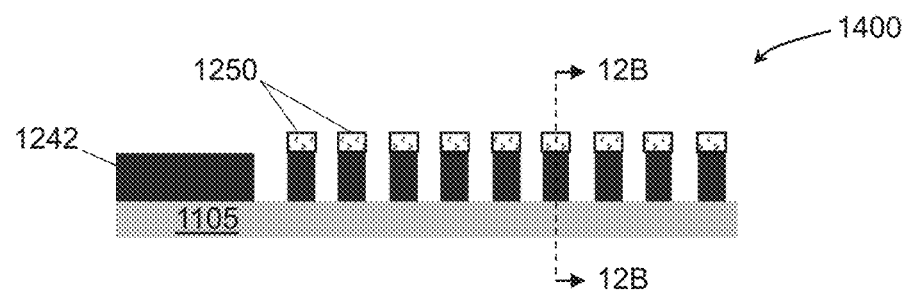

FIG. 14A depicts a portion of another active grating coupler for which the teeth of the grating are etched all the way through a semiconductor layer and the teeth are capped with PCM.

Figure 14B:
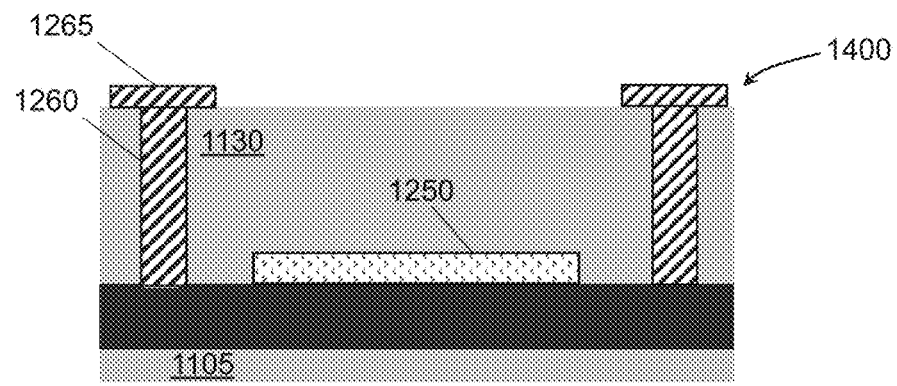

FIG. 14B depicts a cross-section of the grating coupler of FIG. 14A further processed to include conductive vias and contact pads.

Figure 15A:
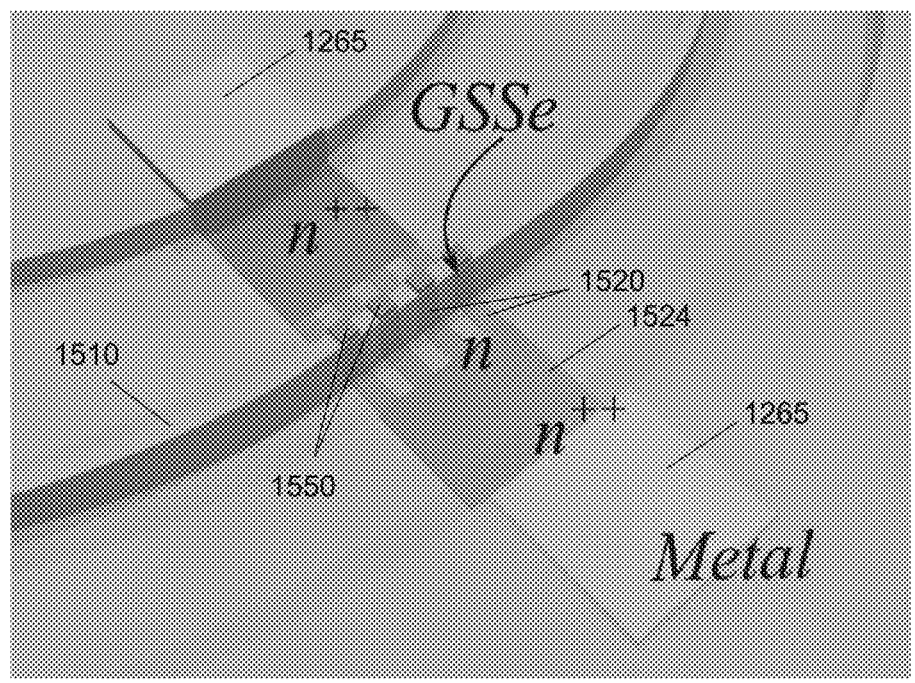

FIG. 15A depicts an active optical waveguide having a plurality of PCM islands formed on the waveguide to change at least one optical characteristic of the waveguide.

Figure 15B:
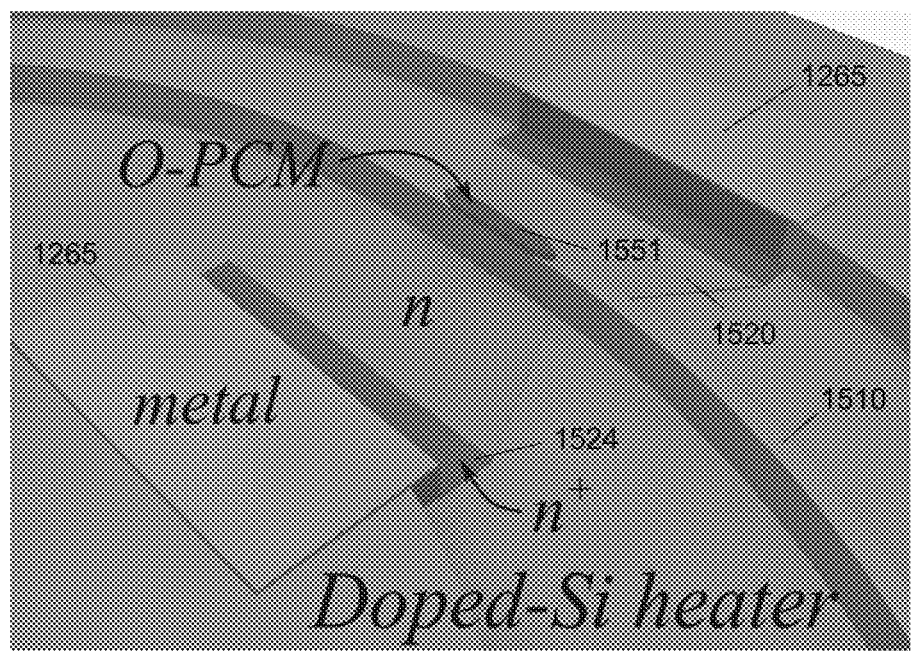

FIG. 15B depicts an active optical waveguide having a PCM strip formed along the waveguide to change at least one optical characteristic of the waveguide.

Figure 16A:
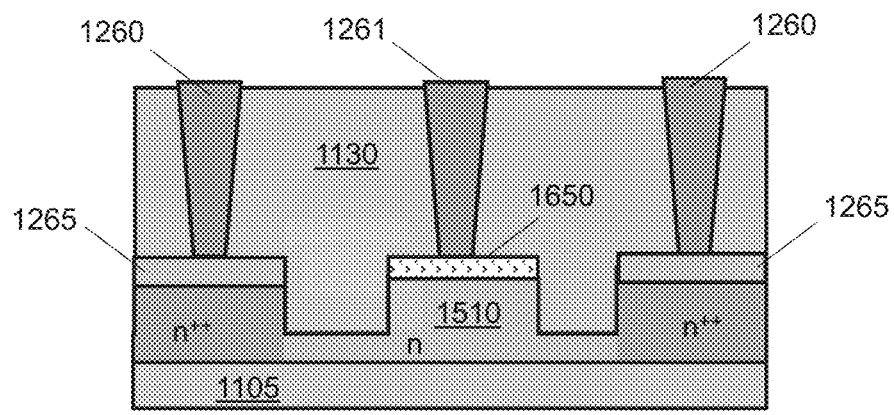
Figure 16B:
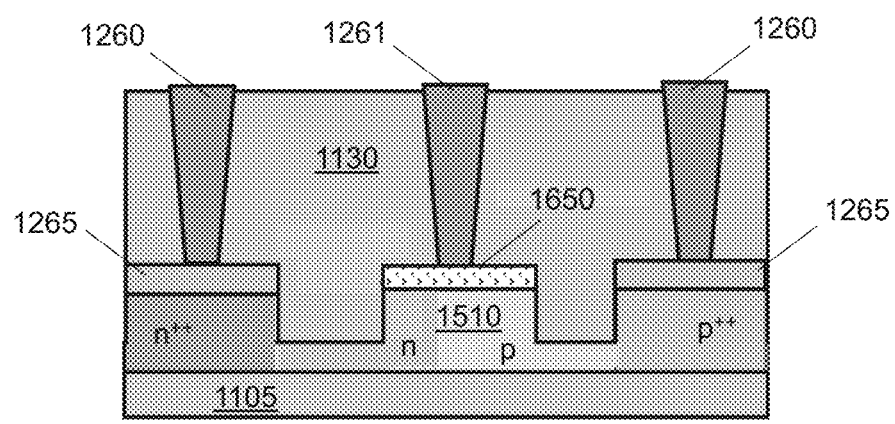

FIG. 16A and FIG. 16B depict electrical configurations that may be used with a PCM island or strip of FIG. 15A or FIG. 15B.

Figure 17A:
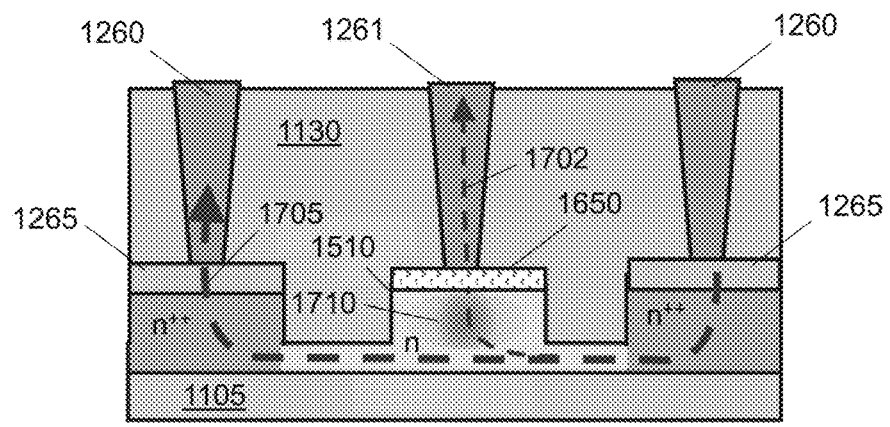
Figure 17B:
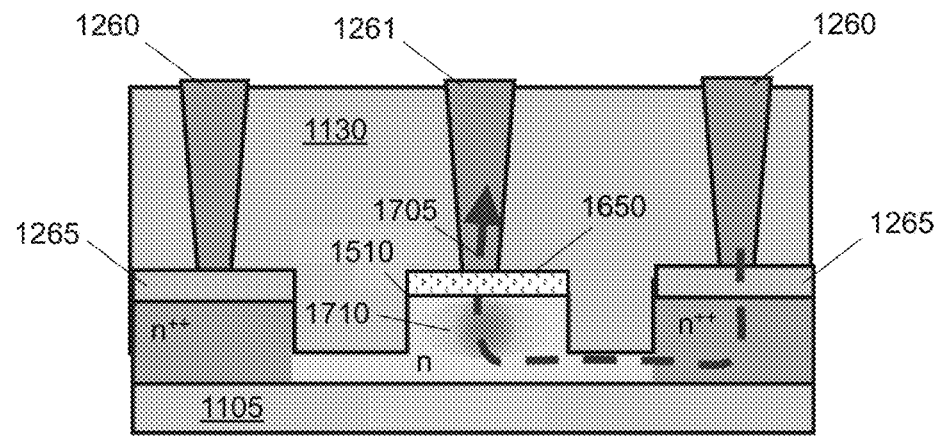
Figure 17C:
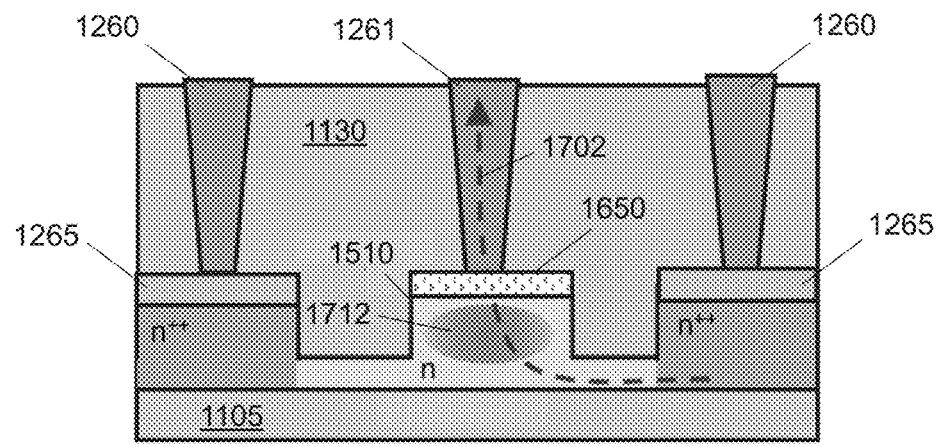

FIG. 17A, FIG. 17B, and FIG. 17C depict modes of operation of an active waveguide for an electrical configuration of FIG. 16A.

DETAILED DESCRIPTION

Various optical devices that would otherwise have static optical characteristics can be transformed into optically-active devices by adding or incorporating optical phase-change material (PCM) into the optical devices. The PCM may comprise a material, such as $Ge_2Sb_2Se_xTe_{5-x}$ (x=0 to 5), that can undergo a reversible solid-state phase change between a crystalline state and amorphous state when heated. A large change (up to 50% or higher) in the real part n of the refractive index of the PCM can accompany the phase change. In some cases, a change in the imaginary part k of the refractive index can additionally or alternatively accompany the phase change. The ability to control n and/or k of the PCM can provide adjustment and control of at least one optical characteristic of the optical device that includes the PCM.

PCM-Based Meta-Atoms for Focusing and Modulating Light

Figure 1A:
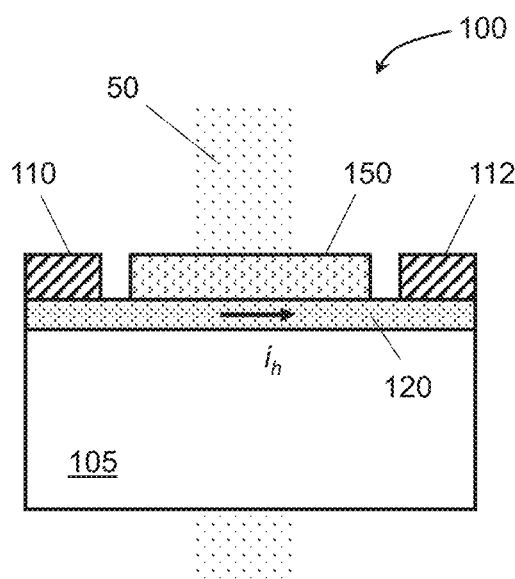
FIG. 1A depicts an example of an optical device having a reversible phase-change material (PCM) that can be heated to transition between a crystalline phase and an amorphous phase.

FIG. 1A depicts an example of a simple optically-active device 100 having a reversible phase-change material. The PCM 150 may be deposited on a heating element 120 that can provide heat to the PCM. The heating element 120 may include a resistive metal or resistive semiconductor through which a heating current $i_h$ can flow to generate ohmic heat. Contact pads electrodes, and/or conductive interconnects 110, 112, can electrically contact the heating element 120 and be used to drive current through the heating element 120 locally to heat the PCM 150. For example, the region of heating may be restricted by the contact pads and/or other conductors to be in the immediate vicinity of the PCM 150 (e.g., within 10 microns). The PCM 150 and heating element 120 may be deposited on or otherwise formed on an optically transparent substrate 105, so that an optical beam 50 can pass through the stack.

Figure 1B:
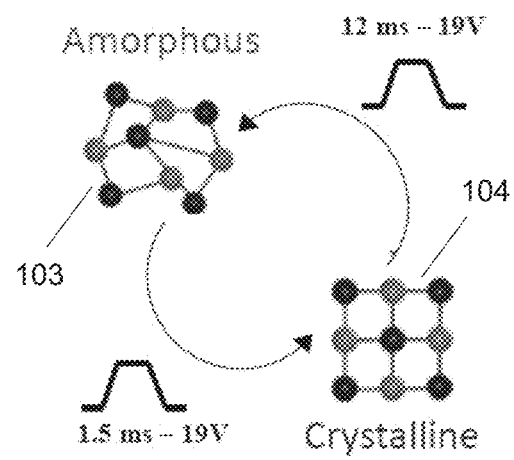
FIG. 1B depicts an example of a pixelated heating element.

The heating element 120 may be structured and/or pixelated as depicted in FIG. 1B to provide a desired thermal distribution and resulting optical response of optical components having PCM 150. A structured heating element 120 may have a particular shape (e.g., round, oval, polygonal, linear, ring, or a free-form shape) and/or a spatial variation in resistance that induces a desired spatial heating distribution. A pixelated heating element 120 can include a plurality of addressable pixels 121. Individual or groups of pixels 121 may be addressed using conductive interconnects patterned on the substrate 105.

A heating element 120 (whether structured and/or pixelated or uniform) can also be in optical communication with nearby optical components, such as meta-atoms and/or PCM. The heating element's refractive index and/or shape can contribute to altering the phase front and/or wave front of radiation passing through the nearby optical components and the heating element to obtain a desired optical response, such as focusing, polarization control, beam shaping, etc.

Figure 1C:
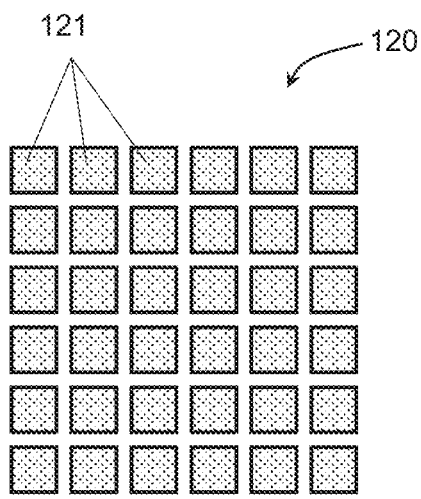
FIG. 1C depicts a reversible phase-change process corresponding to the PCM of FIG. 1A.

When heated, the PCM can undergo a reversible phase change between an amorphous state 103 and crystalline state 104, as depicted in FIG. 1C. For example, a first pulse of current $i_h$ for 1.5 milliseconds (ms) at a first voltage (19 V in this example) can transition the PCM from the amorphous state to the crystalline state. In the crystalline state, the PCM may have a first value of real refractive index $n_1$. A second pulse of current $i_h$ for 12 ms at the same voltage can transition the PCM from the crystalline state back to the amorphous state. In the amorphous state, the PCM may have a second value of real refractive index $n_2$. The value $n_1$ may be significantly higher than $n_2$. Accordingly, transitions between the two solid states can controllably alter one or more optical properties (e.g., optical path length, output phase, intensity, polarization, etc.) relating to the optical beam 50 passing through the PCM 150. If the optically active device 100 were incorporated into an arm of an interferometer, for example, it could be used to controllably adjust an output from the interferometer (e.g., switching an output between on and off states). Intermediate states between the amorphous and crystalline states can also be utilized to controllably adjust an output from the interferometer.

Other ways to heat the PCM are possible. For example, the heating element 120 may or may not be electrically conductive but may absorb radiation from an optical beam at a selected wavelength to generate heat that is transferred to the PCM 150. The absorbed wavelength for heating may be different from the wavelength for which the optically-active device 100 is designed to operate. In some cases, the absorbed wavelength used for heating may be the same as the design wavelength and different power levels are used for writing the phase of the PCM and transmitting an optical beam through the PCM between writes. If speed and local heating are not a concern, then the heating layer 120 may be omitted and the entire substrate 105 may be heated by any suitable means. Further details of PCMs can be found in U.S. Pat. No. 10,634,938 titled "GSST and Applications in Optical Devices," filed Mar. 30, 2018, which is incorporated herein by reference in its entirety.

Figure 1D:
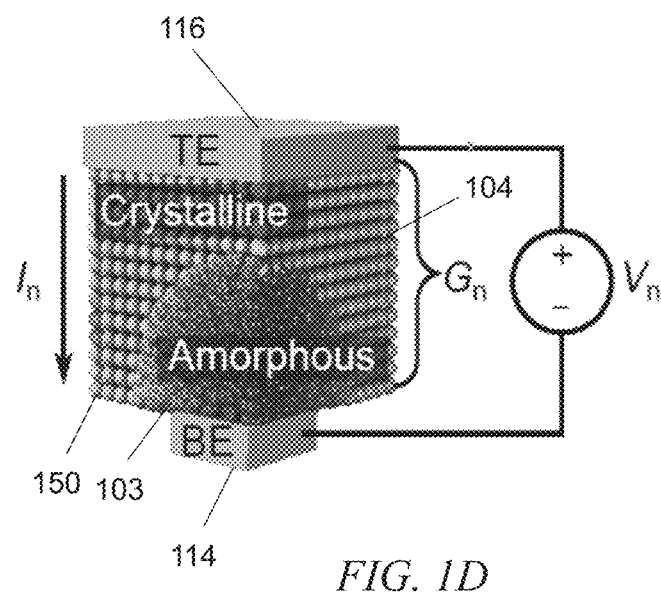
FIG. 1D depicts another example of an optical device having a reversible phase-change material (PCM) that can be heated to transition, at least in part, between a crystalline phase and an amorphous phase.

FIG. 1D depicts yet other ways to operate a PCM 150. In some cases, a current $I_n$ can be driven through the PCM to sense a phase state and/or intermediate phase states of the PCM. Since the PCM has some resistance and conductance $G_n$ that depends upon the phase of the PCM, different resistance and/or voltage values can be associated with different phase states of the PCM. One of the electrodes 114 may also be used to heat the PCM. The electrode may be resistive and generate heat in response to an applied heating current or it may be in thermal contact with a heating element and conduct heat to the PCM. By making one of the contact electrodes 114 smaller in lateral area than the PCM, thermal flux into the PCM can have a non-uniform density within the PCM. The non-uniform thermal flux can provide non-uniform heating within the PCM and can cause a portion of the PCM to transition from a crystalline phase 104 to an amorphous phase 103, as depicted in FIG. 1D. The size of the portion that transitions from one phase to the other phase can be adjusted by an amount of applied heat. In this manner, the refractive index values n and k may be continuously or discretely adjusted across their full range of index values.

Discrete tuning may be achieved by applying discrete amounts of thermal flux or discrete thermal pulses. The small electrode 114 may be sub-wavelength size in some cases and there may be an array of such small electrodes patterned on a surface of the PCM. The sides of the small electrode 114 may be surrounded by or coated with an insulating material to provide a flat surface onto which the PCM 150 can be deposited. Electrical contact to the small electrode may be made using an interconnect located below the small electrode 114 and surrounding insulating layer. In some implementations, the electrodes 114, 116 may be transparent electrodes (e.g., formed from indium tin oxide (ITO)) or may exhibit some optical loss (e.g., up to 30%). In some cases, the current $I_n$ may be used to heat the PCM alone or in addition to current supplied to a heating element that heats the PCM.

In some implementations, the structure of FIG. 1D may be part of a larger structure having pixelated electrodes and/or heating elements. Nonuniformities of phase state and refractive index induced in the PCM can be used for an optical effect such as focusing, defocusing, or diffraction of radiation passing through the PCM.

Referring again to FIG. 1A, the lateral area (measured across the surface of the substrate 105) of the heating element 120 can be smaller than the lateral area of the PCM 150 in some cases. This configuration may also allow non-uniform heating of the PCM 150 and continuous or discrete adjustment of n and k across their full range, as described for FIG. 1D. As one example, the heating element 120 may be patterned as a strip that runs between the contact pads electrodes, and/or conductive interconnects 110, 112 and that is narrower (in a direction into the page of the drawing) than the PCM 150.

FIG. 2A and FIG. 2B depict control and adjustment of the focal length of a meta-lens 200 having PCM. A meta-lens includes a substrate 210 and at least one meta-surface 220. The substrate can be transparent at a design wavelength for the meta-lens 200 and may have one or more flat surfaces on which one or more meta-surfaces 220 are formed. In some implementations, the substrate 210 can include at least one non-flat surface on which at least one meta-surface 220 is formed. The meta-surface 220 includes a plurality of meta-atoms 225, described further below, that impart an optical functionality (focusing in this example) to the meta-lens 200. The meta-atoms 220 can include at least one dimension (transverse to the optical axis 250 or along the optical axis) that is less than the wavelength of operation for which the meta-lens 200 is designed or less than the wavelength of operation divided by the real refractive index of the material from which the meta atoms are formed.

Figure 2C:
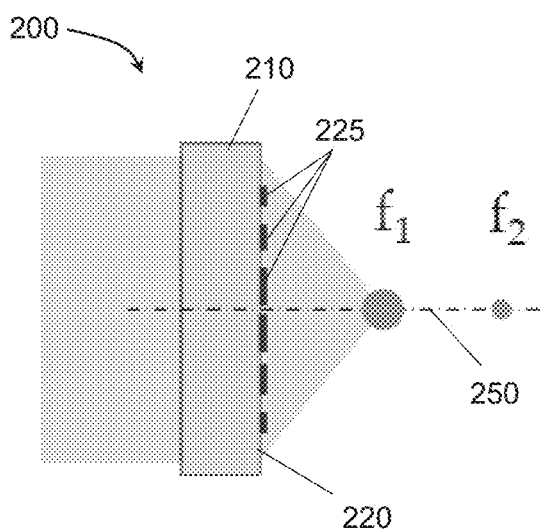
FIG. 2C shows a portion of a meta-surface of an optically active meta-lens that includes meta-atoms (shown in the magnified portion) that are formed from or incorporate PCMs.
Figure 2C:
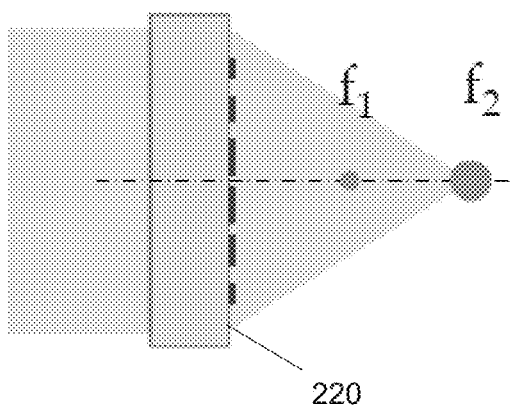
Figure 2C:
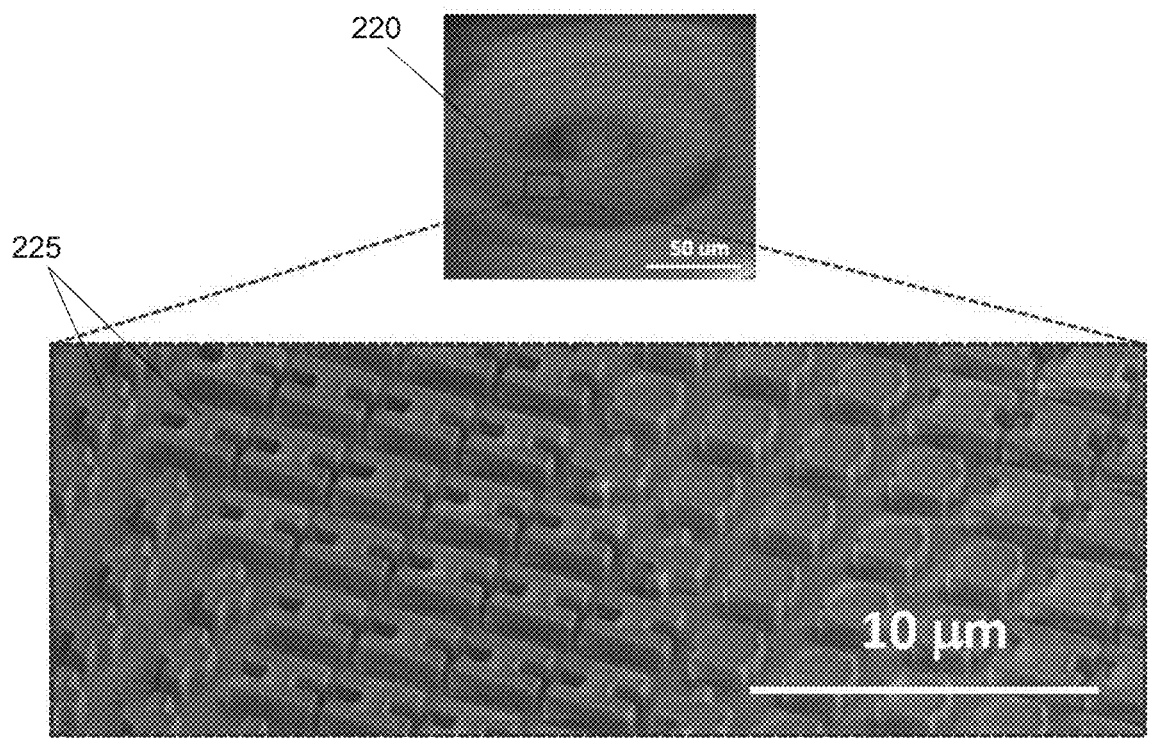

FIG. 2C shows a portion of a meta-surface 220 of an optically active meta-lens that includes meta-atoms 225 (shown in the magnified portion) that are formed from or incorporate PCM. Because the meta-atoms can be individually tailored and different shapes can be used on a same meta-surface, a meta-optic can exhibit significantly-improved performance over conventional optics, such as an extremely wide field-of-view imaging and/or aberration-free focusing. Further details of meta-atoms and meta-optics can be found in U.S. patent application Ser. No. 16/894,945 titled "Ultra-Wide Field-of-View Flat Optics," filed Jun. 8, 2020, which application is incorporated herein by reference in its entirety. Including PCM with the meta-atoms 225 allows a controllable adjustment to the meta-atoms during use of the meta-lens. For example, by changing the refractive index of the PCM included with the meta-atoms 225, the focal length of the meta-lens 200 can be changed from a first length $f_1$ (as depicted in FIG. 2A) to a second focal length $f_2$ (as depicted in FIG. 2B). The combination of PCM with a meta-lens can result in a varifocal aberration-free lens or lenses with varying field-of-views, depth-of-fields, varying spectral and/or polarization responses, etc.

In some cases, heating of the PCM on a meta-lens 200 can be globally across the lens. For example, all meta-atoms are heated uniformly to a same temperature concurrently. Any of the heating methods described above may be used. In other cases, each meta-atom 225 or groups of meta-atoms may be heated using apparatus depicted in FIG. 1A, FIG. 1B, or FIG. 1D. Microfabrication and/or nanofabrication techniques may be employed to pattern the heating element 120 at micron or sub-micron sizes, for example, in a pixelated fashion with each meta-atom actuated independently by its own heating element.

Figure 3A:
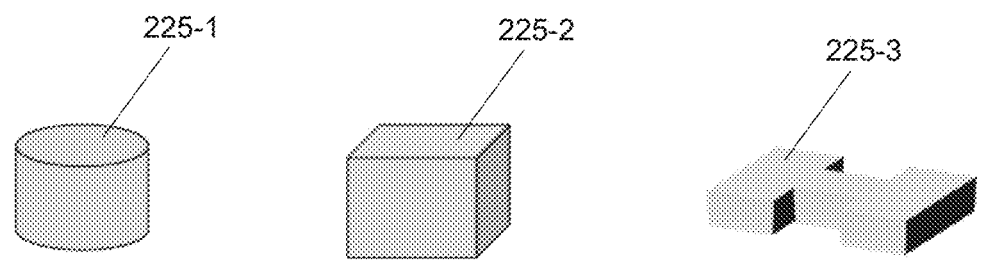
FIG. 3A illustrates examples of three meta-atoms that may be used with or formed from a PCM and located on a meta-surface of an optical device.

FIG. 3A illustrates example shapes of three meta-atoms that may be used with or formed from PCM and located on a meta-optic device. The illustration depicts, in perspective view, a cylindrical meta-atom 225-1, a square meta-atom 225-2, and an H-shaped meta-atom 225-3. A meta-atom 225 can have a one of many different shapes which are not limited to the three shown in the illustration. For example, the meta-atoms 225 may have one or more of the following shapes: rectangular, polygonal, bar, beam, elliptical (pillars or discs), rings, crosses (+), X-shaped (x), V-shaped, L-shaped, or freeform shapes. A meta-atom 225 may be formed, in part, from a semiconductor material that has been patterned on an underlying transparent substrate, such as sapphire. Various dielectric, semiconductor, or metal materials may be used for the meta-atoms that are amenable to micro-fabrication processes. Example semiconductor materials include, but are not limited to, silicon, silicon-carbide, indium-phosphide, gallium-nitride, gallium-arsenide, etc. Other meta-atom materials include silicon nitride (SiNx) and titanium dioxide (TiO2). Lead telluride (PbTe) can be used as a meta-atom material with a calcium fluoride (CaF2) substrate for mid-infrared wavelengths. The meta-atoms can also be directly etched into a substrate, e.g., a silicon substrate. The choice of materials can depend upon the wavelength or wavelengths for which the optical device is designed.

Because the meta-atoms 225 can be smaller than the design wavelength, the wavefront of an optical beam traversing a meta-optic can be manipulated on a sub-wavelength-area by sub-wavelength-area basis across the phasefront of the optical beam to obtain a desired optical functionality (focusing, diffraction, phase rotation, change in orbital angular momentum, effective aperture effect via local transmittance, phase, and/or polarization control, etc.) with the meta-optic. Including PCM with the meta-atom, where the phase of the PCM may be toggled between two values, changed continuously, or changed in discrete steps between two values can allow control and adjustment of optical characteristics of the meta-optic and dynamic control and adjustment of a beam's phase front. For example, during use a meta-lens may have its focal length reversibly toggled (as in FIG. 2A and FIG. 2B), swept, or stepped discretely between two values by applying heat to the meta-atoms 225. As another example, a meta-optic may be changed from a focusing optic to a diffractive or diverging optic during use by applying heat to the meta-atoms 225. In yet another example, the effective aperture of a meta-optic may be varied via local transmittance, phase, and/or polarization modulation.

In some cases, the thickness and/or the geometry of the PCM 150 can be chosen such that the maximum and minimum values of refractive index n correspond to a change in optical phase from 0 to 180 degrees (0 to $\pi$ radians), or from 0 to 360 degrees (0 to $2\pi$ radians). However, other ranges of phase change are possible that are smaller than or larger than these phase ranges. For example, the thickness of the PCM 150 can be chosen to provide a phase change of more than $2\pi$ radians (e.g., $4\pi$ radians).

Meta-atoms having a tunable phase shift greater than $2\pi$ radians allow more sophisticated interference across meta-atom arrays and thus advanced wave front manipulation. For example, it is possible to design continuously tunable meta-lenses (e.g., varifocal lenses) by modulating groups of meta-atoms (e.g., groups of meta-atoms located on concentric rings). This allows additional degrees of freedom for light control without individually tuning each meta-atom to achieve such control.

Figure 3B:
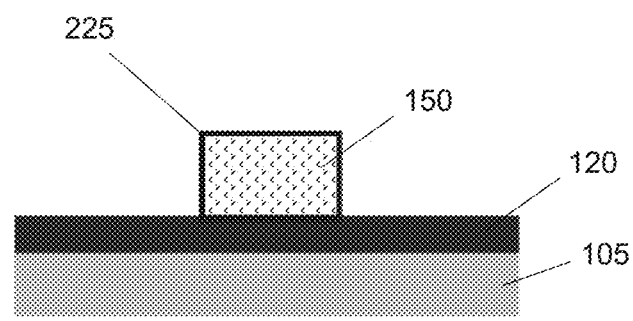
FIG. 3B shows a cross section of a meta-atom that is formed from a PCM.

FIG. 3B shows one way in which a meta-atom comprises PCM. In the illustrated cross-section, the meta-atom 225 is formed entirely from PCM 150. The meta-atom may be cylindrical, rectangular, or square, for example. A heating element 120 extends across the substrate 105 in the example but may have the same surface area or smaller surface area than the PCM in some cases.

Figure 3C:
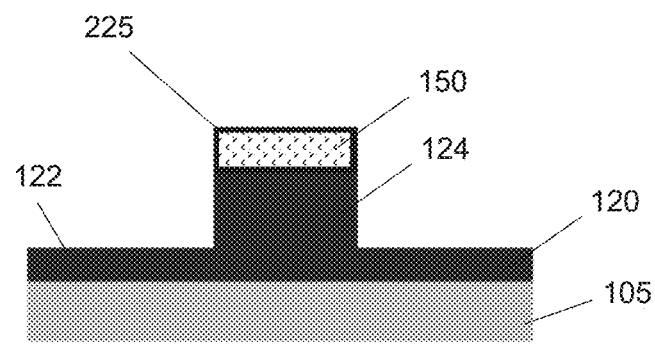
FIG. 3C shows a cross section of a meta-atom that incorporates a PCM.

FIG. 3C shows another way in which PCM 150 can be incorporated into a meta-atom 225. In this example, the PCM 150 is deposited on top of a portion of the meta-atom that is part of the heating element 120. For example, the portion of the meta-atom may be etched into the heating element 120. The etching produces a mesa 124 in the heating element. The mesa 124 and the PCM 150 can form a meta-atom of any desired shape. The heating element may be or include silicon, for example, and heat can conduct up through the mesa 124 to the PCM 150. This device architecture thus allows and leverages both optical and thermal communications between the structured PCM and heater in a hybrid meta-atom structure.

For meta-atoms described above and below, the thickness of the PCM 150 (in a direction normal to the planar interface between the PCM 150 and heating element 120 can be between 5 nanometers (nm) and 5 microns (μm). The thickness of the heating element 120 or its thinned portion 122 can be between 10 nm and 5 μm. A total thickness of the meta-atom (including PCM 150) can be between 10 nm and 10 μm. There can be thousands to millions of meta-atoms or more formed on a meta-surface.

Figure 3D:
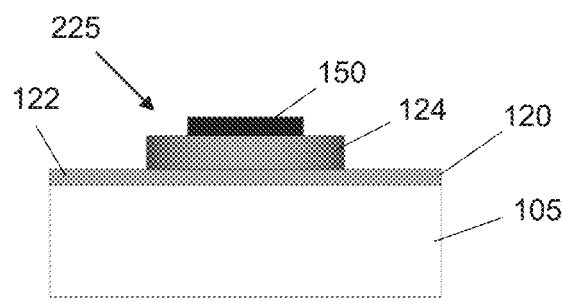
Figure 3E:
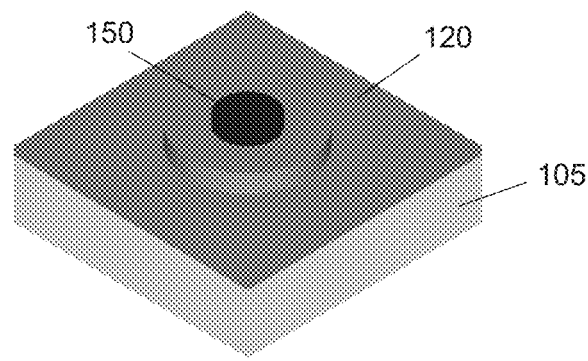

FIG. 3D depicts another meta-atom structure in which the PCM 150 on top of the mesa 124 has a smaller area than the mesa. The meta-atom 225 comprises the mesa 124 and the PCM 150. The illustrated structure may provide more uniform heating of the PCM 150 or modified/enhanced light-matter interaction across the hybrid PCM-heater meta-atom structure than the structure shown in FIG. 3C. FIG. 3E is a perspective view of the structure shown in FIG. 3D.

Figure 3F:
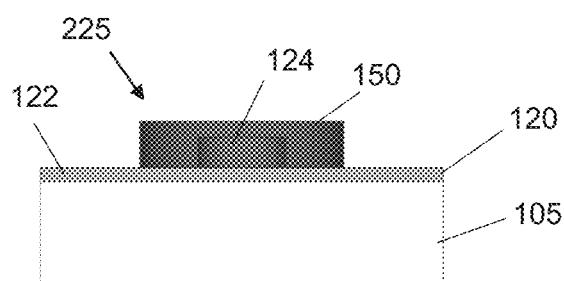
Figure 3G:
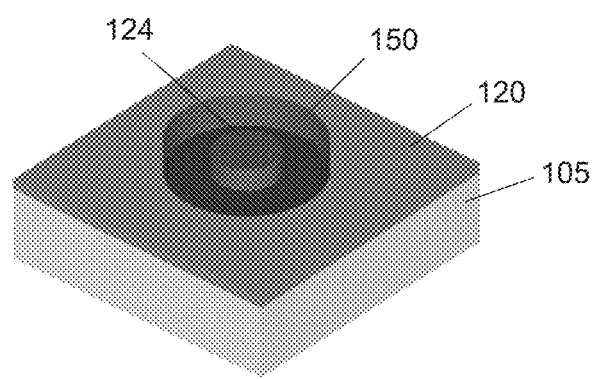

FIG. 3F depicts another meta-atom structure in which the PCM 150 covers and surrounds the mesa 124. The meta-atom 225 comprises the mesa 124 and the PCM 150. The illustrated structure may provide higher changes in refractive index values n and k than the structures shown in FIG. 3C and FIG. 3D. FIG. 3G is a perspective view of the structure shown in FIG. 3F.

Figure 3H:
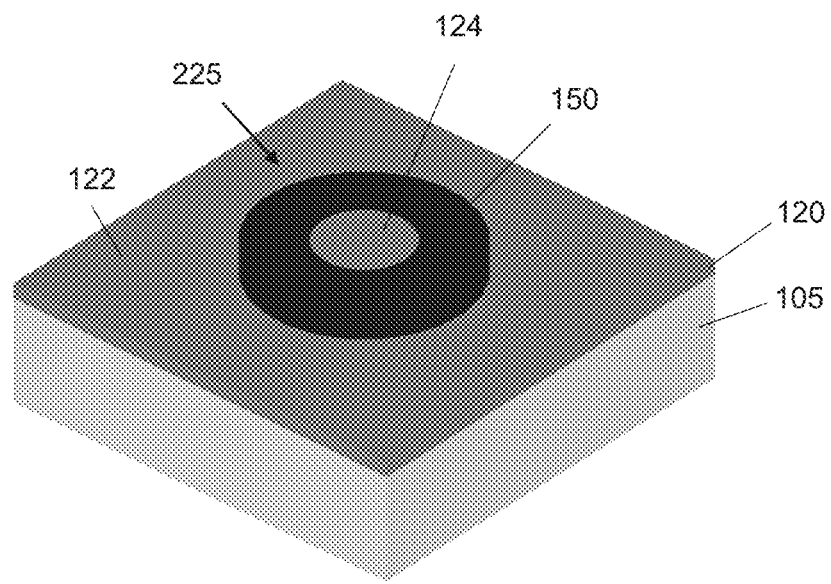

FIG. 3H shows a perspective view of another meta-atom structure in which the PCM 150 surrounds the mesa 124 but does not cover the mesa. The meta-atom's mesa 124 may be formed by patterning and etching the heating element 120 using microfabrication processes (e.g., photolithography and reactive ion etching). Subsequently, the PCM may deposited as a uniform layer across the surface of the etched heating element 120. Selective or timed chemical mechanical polishing (CMP) may be used to remove PCM 150 from the top of the mesa 124. The PCM can be patterned and etched after or before the CMP step using microfabrication processes (e.g., photolithography and reactive ion etching) to form the meta-atom 225.

Figure 3I:
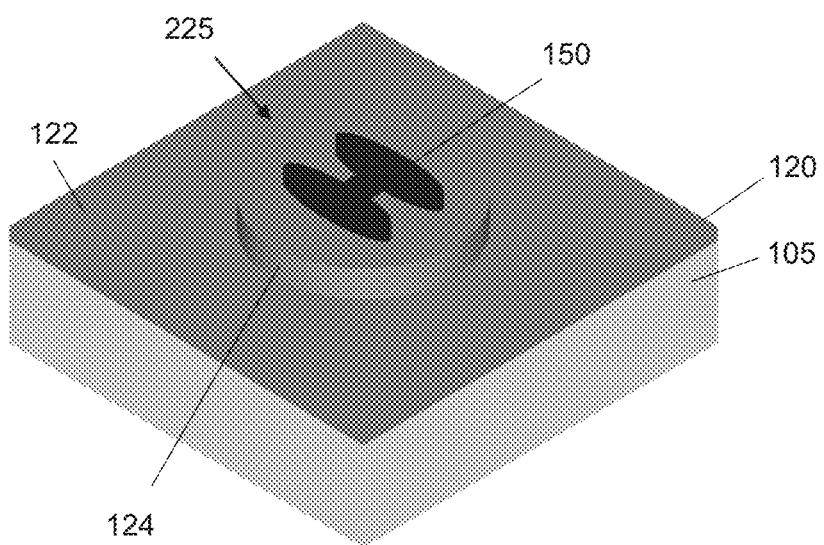

FIG. 3I shows a perspective view of another meta-atom structure in which the meta-atom 225 comprises two different shapes (a cylindrical disc mesa 124 and an H-shaped PCM 150). In general, the shape of the PCM 150 can be different from the shape of a portion of the meta-atom formed in the underlying material. The use of different shapes in a meta-atom 225 may further alter the optical characteristics of a meta-surface via tailored optical and thermal communications within the hybrid PCM-heater meta-atom structure. For example, the H-shaped PCM 150, when in a first phase state, may have a small influence on the meta-atom's optical characteristics when its refractive index n matches or is near the value of the refractive index of the heating element 120 and/or mesa 124. In that case, the meta-atom may operate more like a cylindrical meta-atom. When the PCM 150 is in a second phase state, its refractive index n may change to a value significantly different from the refractive index of the heating element 120 and/or mesa 124. In this case, the meta-atom's optical characteristics may be significantly influenced by the H-shaped PCM 150 and may differ appreciably from a cylindrical meta-atom.

The structures depicted in FIG. 3C through FIG. 3I can enhance the thermal function of the heating element 120 and mesa 124. Heat can be conducted into the mesa 124, where it can radiate vertically and/or laterally to heat PCM 150 above and/or around the sides of the mesa 124. Such a structure may increase the heating volume and/or improve heating uniformity. Additionally, the mesa 124 and PCM 150 can form part of a hybrid PCM-heater meta-atom structure. The mesa 124 and PCM 150 can contribute to and may enhance the light-matter interaction of the hybrid meta-atom structure to obtain a desired effect on radiation passing through the hybrid meta-atom structure.

Although the embodiments in FIG. 3C through FIG. 3I depict cylindrical mesas 124, the invention is not so limited. In some cases, the mesa 124 may instead be patterned in any shape from a material (e.g., a nitride or different semiconductor) that is deposited on the heating element 120. Additional material layers may be inserted and patterned beyond what is shown in the drawings. In some cases, the mesa 124 may instead be formed as an electrode 114 like that in FIG. 1D, though its area may be the same size or larger than the area of the overlying PCM 150. Regardless of how it is formed, the mesa 124 may have any shape described above for meta-atoms 225. The meta-atoms in FIG. 3A through FIG. 3I may be covered with one or more layers (e.g., passivation layer, cap layer, optically transparent protective layer, etc.).

FIG. 4A and FIG. 4B depict control and adjustment of a parfocal zoom lens 400 that can provide at least 10× optical zoom. In some cases, up to 50× optical zoom may be achieved. The zoom lens 400 can be formed on a single substrate 410 with two meta-surfaces 422, 424 having meta-atoms comprising PCM. In some cases, the two meta-surfaces 422, 424 may be formed on separate substrates that are mounted in an assembly to form a zoom lens. The meta-atoms may include one or more of the structures described above in connection with FIG. 3A through FIG. 3I. For the illustrated example, the substrate 410 can be zinc selenide (ZnSe), calcium fluoride (CaF2), silica (SiO2), etc. and the zoom lens can be used for infrared imaging with wavelengths of approximately 1.55 μm, 5 μm, etc or between 1 μm and 10 μm. The meta-atoms can be formed at least from one or more of GSST, GST, GSSe, $VO_2$ alone or in combination with other materials as described above. Imaging at other wavelengths is possible by selecting different materials and/or scaling the meta-atom sizes and spacings.

The zoom lens 400 can include an entrance meta-surface 422 having meta-atoms formed on a first surface of the substrate 410 and a second meta-surface 424 having meta-atoms formed on a second surface of the substrate. The substrate may have a thickness $t_{sub}$ between 0.1 mm and 10 mm. The spaces between the multiple surfaces in the optical system (such as the meta-surfaces 422, 424, window surface, image plane 430, etc.) can be filled mostly (e.g., more than 50%) or entirely with air or another medium (e.g., epoxy, glass spacer, etc.). By toggling, stepping, or sweeping the phase state of the PCM in the meta-atoms, the optical functionalities of the first meta-surface 422 and second meta-surface 424 can be independently and controllably changed between different optical functionalities, such as a converging lens and a diverging lens, as illustrated by computed rays in FIG. 4A and FIG. 4B. The independent change in focusing characteristics of the two meta-surfaces can provide optical zoom with a fixed track-length of the optical train.

In some implementations, a first meta-surface 422 can be used for a different optical function than the second meta-surface. For example, the first meta-surface 422 can be used for beam steering and the second meta-surface 424 can be used for imaging, so that an ultrawide field-of-view can be imaged by sweeping input rays from across the field-of-view.

For the illustrated example, the zoom lens can have an entrance pupil diameter $D_p$ that is controllably adjusted from 1 mm to 3 mm, though other values are possible. The fixed track length from the first meta-surface 422 to the image plane 430 is 3.5 mm. The back focal length $f_b$ is approximately 1.5 mm. The field of view can vary from 40 degrees to 4 degrees, and the F-number vary from 0.65 to 2.1. The effective focal length of the zoom lens 400 ranges from 0.65 mm to 6.5 mm, and the maximum image distortion ranges from −5% to about 0.4%. The relative illumination of the zoom lens can be no less than 95%.

The effective aperture of the zoom lens 400 or other meta-lens can be varied by modulating the local transmittance, phase, spectral, and/or polarization response of the lens's meta-surface. For example, a portion of the meta-atoms on one or more meta-surfaces 220, 422, 424 can be tuned to adjust their transmittance to set the effective aperture size for the lens or optical system containing the lens. In another example, the phase of a portion of the meta-atoms on one or more of the meta-surfaces 220, 422, 424 can be tuned to selectively steer a portion of the beam and thereby adjust the effective aperture size of the lens or optical system containing the lens. In another example, the polarization response of a portion of the meta-atoms on one or more meta-surfaces 220, 422, 424 can be tuned to selectively transmit or block a portion of the beam having certain polarizations, so as to adjust the effective aperture size for light of such polarizations passing through the lens or optical system. In another example, the spectral response of a portion of the meta-atoms on one or more meta-surface 220, 422, 424 can be tuned to selectively transmit or block a portion of the beam of certain wavelengths, so as to adjust the effective aperture size for light of such wavelengths passing through the lens or optical system.

Optically Active Meta-Waveplates

FIG. 5A depicts, in plan view, an example of an optically active meta-waveplate 500 that has been divided into a plurality of sections (512-1 through 512-8). Each section includes a meta-surface 520 with meta-atoms that include PCM. Such waveplates 500 may have two or more sections with meta-surfaces 520 that can be controlled independently of each other and may have shapes other than circular and pie-shaped. In the illustrated example, the waveplate 500 is disc-shaped and divided into eight wedge- or pie-shaped sections that can be independently controlled. An optical beam can pass through the waveplate travelling in a direction into or out of the plane of the paper.

PCM in each meta-surface section (512-1 through 512-8) can be controlled by, for example, flowing electrical current through a heating element that is adjacent to the meta-surface 520 (e.g., lying under each meta-surface 520). For the embodiment of FIG. 5A, a first common electrode 512 can connect to the heating element and be located at a center of the meta-waveplate 500. The common electrode 512 may connect to a reference potential (e.g., ground) in the substrate or through a lower or upper conductive interconnect. Eight independent, arc-shaped electrodes (electrodes 514-1 through 514-8) can be located at the periphery of the waveplate and connect to metal interconnects 530 of an integrated circuit. Heating of the PCM sections can be independently controlled through the interconnects 530.

The arrangement of electrodes in FIG. 5A may lead to non-uniform heating within each section (513-1 through 513-8). For example, the current density in each section of heating element underlying a meta-surface 520 will be higher near the center of the meta-waveplate 500 (close to the common electrode 512) than near the periphery. The temperature change ΔT of the heating element is proportional to electrical power P flowing through a unit volume V of the material. Since P/V is higher near the center of the waveplate 500, the temperature may be higher near the center of the waveplate. Such non-uniform heating may or may not be desirable for the active waveplate 500.

FIG. 5B depicts an alternative arrangement of electrodes 542, 544 for pie-shaped meta-surface sections of FIG. 5A. The electrodes 542, 544 run radially, rather than along polar angles, so that the heating current flows along polar angles for the implementation of FIG. 5B. In some cases, an electrode (e.g., electrode 544) may be shared as a common electrode between two adjacent pie-shaped sections. The arrangement of electrodes in FIG. 5B can mitigate current focusing near the center electrode 512 of FIG. 5A.

Heating simulations for the structure shown in FIG. 5B indicate that non-uniform heating can still occur during operation. FIG. 5C shows the results of such heating simulations. Lighter shading indicates higher temperature. The heating element in the section 513 is uniformly doped so that its resistivity is uniform throughout the material. The temperature rise is higher near the center of the meta-waveplate 500 since the electric field and current are greater near the center than near the periphery of the waveplate. For the simulation, the pie-shaped section 513 shows incremental radial divisions corresponding to different doping levels.

Uniformity of heating can be achieved in each pie-shaped section, or other shapes of heating sections, by varying the resistance or conductance within the heating element for the section 513. The resistance or conductance can be controlled by controlling the doping level and its spatial distribution in semiconductor materials, such as silicon. FIG. 5D depicts non-uniform doping in a section 513, that can mitigate non-uniform heating in the section. There are 47 different doping levels in arc-shaped strips in the section. The width of each arc-shaped strip is about 4 microns. The doping levels range from about $2 \times 10^{17}$ cm$^{-3}$ near the center of the waveplate to about $1 \times 10^{20}$ cm$^{-3}$ near the outer periphery of the section 513 and waveplate.

FIG. 5E plots simulated heating results for a similar section 513 in which the doping in the heating element is non-uniform. The results show that uniform heating can be achieved in the pie-shaped section 513 of an active meta-waveplate 500. For the simulation, the pie-shaped section 513 is partitioned into sub-sections having different doping levels in both the radial direction and angular direction.

The active meta-waveplate of FIG. 5A may be used to control the internal orbital angular momentum (OAM) of optical beams passing through the meta-waveplate 500. In some implementations, a meta-waveplate 500 may be used to alternatively or additionally control the polarization of an optical beam (e.g., the meta-atoms can be designed to have adjustable birefringence). The internal OAM relates to the wavefronts or phase fronts of an optical beam. A beam with no internal OAM has disconnected planar wavefronts—essentially a stack of flat, parallel planes spaced apart by the optical wavelength of the radiation divided by the refractive index in which the radiation travels.

An optical beam with internal OAM can have wavefronts that are not flat and parallel. One interesting case is helical wavefronts, an example of which is shown in FIG. 6A. Photons in coherent optical beams having helical internal OAM can have discretized wavefunctions that are proportional to $e^{il\theta}$ where l is a positive or negative integer and θ is the polar angle. The value l relates to a distance (in wavelengths of the optical beam along the optical axis 610) for one rotation of the helical wavefront 605. For example, l=±1 represents and optical beam having a helical wavefront where one rotation of the helix steps one wavelength along the optical axis 610. For l=±2, one rotation of the helix steps two wavelengths along the optical axis 610. For l greater than 0, the helical wavefront 605 is left-handed, like that in FIG. 6A. For l less than 0, the helical wavefront is right-handed.

FIG. 6B, FIG. 6C, FIG. 6D, and FIG. 6E and the corresponding table of voltages and phases depict how a meta-waveplate 500 of FIG. 5A can be used to control OAM of an optical beam. The meta-atoms in each section (513-1 through 513-8) having a meta-surface 520 can control the wavefront of the optical beam on a point-by-point basis. The meta-atoms may differ within each section 513. The PCM included with the meta-atoms may have a thickness such that a maximum applied voltage can impart up to 315 degrees ($7\pi/4$) phase change. Various amounts of phase change in each section may be achieved by partial phase state transition of the PCM, as described above in connection with FIG. 1D. Different patterns of voltages shown in FIG. 6B, FIG. 6C, FIG. 6D, and FIG. 6E (and corresponding phase changes) can be applied to the eight sections of the meta-waveplate 500 to impart different orbital angular momentum values to the optical beam passing through the waveplate. Accordingly, helical wavefronts having different OAM values can be imparted to a beam passing through the active waveplate 500. Beams with different internal OAM values can be used to multiplex different optical signals onto a common optical path for optical communication systems, such as fiber-optic communication systems.

PCM can also be used in integrated optical devices. For example, PCM can be added to or incorporated in integrated optical waveguides to make the waveguides optically active. FIG. 7 illustrates an example of an active waveguide coupler 700 than includes PCM 750 to controllable change the amount of coupling between two evanescently coupled waveguides: a main waveguide 710 and a tap waveguide 720. FIG. 8 is a scanning-electron micrograph showing a main waveguide 710 controllably coupled to two tap waveguides 720 that include PCM deposited on the tap waveguides.

Active Optical Waveguide Couplers for On-Wafer Testing

The active waveguide coupler 700 shown in FIG. 7 can be used for temporary, on-wafer testing of photonic integrated circuits. For example, the PCM 750 can be placed in a first phase state (e.g., an amorphous state) to increase coupling between the tap waveguide 720 and main waveguide 710. An amount of light (e.g., from 5% to 10%) can be coupled out of the main waveguide 710 into the tap waveguide 720 when the waveguides are more strongly coupled. An output of the tap waveguide 720 can be monitored to determine whether the main waveguide 710 is operating properly. After determining operation of the main waveguide 710, the PCM 750 of the tap waveguide 720 can be placed in a second phase state (e.g., a crystalline state) that can significantly reduce the coupling between the waveguides (e.g., to less than 1%), so that the main waveguide 710 exhibits low insertion loss due to the presence of the tap waveguide 720. Because the solid phases of the PCM 750 are stable (until heated correctly) the temporary coupling is locally erasable and insertion loss remains low after the heating to reduce coupling between the waveguides. The tap waveguide 720 of FIG. 7 can be used for wafer-scale testing of photonic circuits and can have a small footprint. For example, each tap waveguide 720 may couple to a bus testing waveguide, and each tap waveguide 720 may extend parallel to a main waveguide 720 for a distance no greater than 500 microns. Additionally, the coupling by the tap waveguides 720 can be broadband (e.g., coupling radiation from the main waveguide 710 over a bandwidth as wide as 500 nm.

FIG. 9 plots transmitted intensity as a function of wavelength for the main waveguide 710 and a tap waveguide 720 of FIG. 8. Output from a wavelength-tunable source is coupled into the main waveguide 710. The main waveguide couples to or is part of a resonant structure (e.g., a ring resonator, optical cavity, or Bragg grating), which causes the periodic dips in transmitted intensity. An output from the main waveguide 710 is measured as a function of wavelength and plotted as the top trace 910 in FIG. 9. An output from the tap waveguide 720 is also plotted in FIG. 9 as the lower trace 920. The lower trace provides a sufficiently accurate representation, at lower power, of optical behavior in the main waveguide 710 over a spectral range of about 13 nm. An output from the tap waveguide 720 may be used to determine at least one of an optical reflection or an optical transmission of a photonic integrated circuit that contains the main waveguide 710. For this example, the tap waveguide 720 is spaced apart from the main waveguide 710 such that the tap waveguide couples between 50% and 70% of the input intensity to the main waveguide over this spectral range. Less coupling can be obtained by spacing the tap waveguide 720 farther away from the main waveguide.

FIG. 10 plots, as a function of wavelength, coupling efficiency into a tap waveguide 720 having PCM in an amorphous state. Also plotted (lower trace) is insertion loss measured through the main waveguide 710 when the tap waveguide is in a crystalline state for an active waveguide coupler of FIG. 8. When the PCM of the tap waveguide 720 is in an amorphous state, its refractive index may be at a lower value than when the PCM is in a crystalline state. The lower index value can reduce the effective refractive index of the tap waveguide 720 and extend an optical mode profile supported by the tap waveguide farther laterally. As such, the evanescent field of the mode supported by the tap waveguide can interact more with the main waveguide 710 than when the PCM 750 has a higher index value. Accordingly, coupling can increase when the PCM 750 is in an amorphous state. The coupling efficiency ranges from 6% to 4% over a spectral bandwidth of 40 nm. The coupling efficiency is defined as an amount of power coupled into the tap waveguide 710 divided by an amount of power carried in the main waveguide 710 at a location immediately prior to the nearest input end 721 of the tap waveguide 720.

After optical testing of a device on a wafer or chip is completed, the PCM 750 may be heated to crystallize the PCM. This can increase its refractive index and reduce the evanescent field overlap to the main waveguide 710. As a result, less coupling between the waveguides can occur. When the PCM is in the crystalline phase, it is desirable that the presence of the tap waveguide 720 causes low power loss to the main waveguide 710. FIG. 10 plots the power loss (as insertion loss) for the main waveguide 710 due to the presence of the tap waveguide 720. The insertion loss is less than 0.025 dB (less than 0.6%) over the 40 nm bandwidth.

Grating Couplers

PCM may be used in other waveguide applications in photonic integrated circuits, such as for coupling power into or out of integrated optical waveguides. FIG. 11 depicts a portion of a grating coupler 1100 that can be patterned onto or in an integrated optical waveguide 1140 and used to couple power into and/or out of the optical waveguide. In some applications, such grating couplers can be used to couple power between to chips having photonic integrated circuits that may face one another.

The grating coupler 1100 can include a grating pattern of rulings or teeth 1110 and spaces 1120 that is etched into or formed on an optical waveguide 1140. The grating coupler may be surrounded by an upper cladding layer 1130 having a real refractive index value $n_{uc}$ and a lower cladding layer 1105 (which may be a bulk substrate material) having a real refractive index value $n_{lc}$. FIG. 11 depicts a phase matching condition where the Bloch-Floquet harmonic phase constant $\beta_{Bk}$ matches the longitudinal field component $\beta_{Rkz}$ of at least one harmonic of an optical field that will be coupled out of the waveguide 1140 and into the upper cladding 1130 (in this example) at an angle $\theta_k$. The angle of coupling $\theta_k$, out of or into the waveguide 1140, can be determined from the following equation:

$$n_c \sin(\theta_k) = n_B + m\lambda/\Lambda, \quad (1)$$

where $n_B$ is the effective real refractive index of the grating and waveguide 1140 for the optical mode traveling within the grating coupler 1100, m is a positive or negative integer, $\lambda$ is the free-space wavelength of the optical mode, and $\Lambda$ is the spatial pitch of the grating. By changing the refractive index of PCM formed on or incorporated into the grating coupler 1100, the coupling angle can be changed. Alternatively, or additionally, the wavelength for coupling into or out of the grating coupler at the angle $\theta_k$ can be tuned by changing the refractive index of the PCM. The PCM's refractive index can be changed by any of the methods described above for changing the phase state of the material.

FIG. 12A depicts a portion of an active grating coupler 1200 that includes PCM 1250 formed on the grating teeth. For such an embodiment, the PCM may be deposited over the waveguide 1240 before the grating pattern is etched into the waveguide material. In some cases, the waveguide 1240 may be formed in one or more semiconductor layers (e.g., silicon, indium phosphide, indium gallium arsenide, etc.) that are formed on an underlying cladding or substrate material 1105. The waveguide 1240 may be a rib waveguide. The pitch A and the etch depth of the grating can be adjusted through lithographic processes for any suitable wavelength and to adjust coupling efficiency into or out of the grating coupler 1200. Other lithographically-adjustable quantities that may affect the operational wavelength, loss, and coupling efficiency include thickness of the PCM and duty cycle of the grating.

FIG. 12B depicts a cross-section of the grating coupler of FIG. 12A after further processing to include a passivating, cap, or cladding layer 1130, conductive vias 1260, and contact pads or metal interconnects 1265. The passivating, cap, or cladding layer 1130 can be formed from a transparent material, such as an oxide (e.g., $SiO_2$). The vias 1260 may be formed as cylindrical vias. There may be more than one via located along each side of the grating coupler, in the ±z direction. In some cases, the vias 1260 may be rectangular with long sides that run along each side of the grating coupler so as to span several grating teeth 1110.

In some implementations, the grating coupler is formed in one or more semiconductor layers that is, or are, partially etched to form the grating and the optical waveguide 1240. A remaining portion 1220 of the one or more layers can be doped, locally or throughout the remaining portion, to provide heating to the PCM 1250. Electrical current can be driven through the conductive vias 1260 to create heat in the remaining portions 1220. The doping of the semiconductor layer(s), where doped, can be spatially uniform or non-uniform and controlled through lithographic processes. Non-uniform doping profiles may be used to obtain a desired heating pattern in the grating coupler 1200, which heating pattern may be uniform or non-uniform. For example, the doping may be different for each grating tooth or for groups of grating teeth, so that the PCM 1250 on different teeth may have the same or different response to an applied current through the vias 1260.

FIG. 13A depicts a portion of another active grating coupler 1300 for which the teeth of the grating coupler are formed entirely from PCM 1250. For such an embodiment, the one or more layers from which the waveguide 1240 is formed may be etched, at least in part, to open an area where the teeth of the grating will be patterned from PCM 1250. The PCM 1250 can then be deposited in the open area and lithographically patterned to form the grating teeth. Alternatively, a lift-off process may be used to form the PCM 1250 in a grating pattern in the open area. The implementation depicted in FIG. 13A may more strongly influence the effective refractive index $n_B$ of the grating coupler 1300 and provide broader wavelength tuning or angular adjustment than the implementation of FIG. 12A.

FIG. 13B depicts a cross-section of the grating coupler of FIG. 13A further processed to include the passivating, cap, or cladding layer 1130, conductive vias 1260, and contact pads or metal interconnects 1265. The remaining portion 1220 of the one or more layers can be doped locally or throughout the remaining portion to provide heating to the PCM 1250 as described above in connection with FIG. 12A and FIG. 12B. In some cases, one or more teeth of the grating coupler may be heated independently of other teeth in the grating coupler.

FIG. 14A depicts a portion of another active grating coupler 1400 for which the teeth of the grating are etched all the way through one or more layers used to form the waveguide 1242. The one or more layers can include semiconductor material. The waveguide 1242 may be formed as a ridge waveguide structure. The teeth of the grating coupler can be etched entirely through, or more than 90% of the way through the one or more layers from which the waveguide 1242 is formed. The area in which the grating teeth are formed can be covered with PCM prior to patterning and etching the teeth, such that the individual teeth are capped with PCM 1250 once the grating is etched.

FIG. 14B depicts a cross-section of the grating coupler of FIG. 14A further processed to include the passivating, cap, or cladding layer 1130, conductive vias 1260, and contact pads or metal interconnects 1265. The grating teeth may extend laterally beyond edges of the waveguide 1242 so that electrical contact can be made to the teeth by one or more conductive vias 1260. The one or more layers from which the teeth are formed can be doped locally to provide uniform or non-uniform heating of the PCM 1250 as described above in connection with FIG. 12A and FIG. 12B. For the implementation of FIG. 14A and FIG. 14B, the heating of each grating tooth, or groups of grating teeth, may be controlled essentially independently of other grating teeth in the coupler 1400 by providing a pair of conductive vias 1260 and corresponding contact pads or metal interconnects 1265 for each grating tooth or groups of grating teeth.

In some implementations, the PCM on a grating coupler may be heated and undergo phase transitions by using optical heating techniques alternatively or additionally to electrical heating techniques. For example, a laser beam or optical pulse may illuminate the PCM and be absorbed by the PCM or adjacent material to heat the PCM and induce a phase transition, or partial phase transition. The intensity profile of the laser beam or optical pulse, its spatial extent (e.g., focused, patterned, or broadly diffuse), its location, its power or energy, and/or its absorption depth can be controlled to induce a uniform phase transition or partial phase transition in the PCM. In some cases, the radiation to heat the PCM 1250 can be provided through the waveguide coupled to the PCM.

As mentioned above, the PCM included in a grating coupler can provide control of the coupling angle $\theta_k$ into or out of the grating coupler. As such, the PCM can provide beam-steering control of a beam exiting or received by the grating coupler. In some applications, such beam steering may be used to compensate for mechanical misalignment of optical components (e.g., a fiber, optical port on a photonic chip, or lens that are optically aligned to the grating coupler). The grating coupler may be formed on a PIC chip. In some cases, the beam steering may be in free space between chips or between a chip and an optical board or an optical receiving device.

In an example application, tunable grating couplers may be used to facilitate integration and assembly of photonic chips that are packaged onto an interposer or an optical board. Grating couplers may be patterned on both the chip and on the interposer or optical board so that light can be coupled from the interposer or board to the chip or vice versa. The chip may be bonded at a fixed location relative to the board or interposer using a low-cost, high-throughput, pick-and-place method with limited alignment accuracy. Once the chip is bonded, residual misalignment between the two grating couplers may be reduced by tuning the coupling angle $\theta_k$ for one or both grating couplers using the PCM 1250. In some cases, imaging may be used to observe the location of an optical beam on at least one of the grating couplers. In some cases, an optical signal from a waveguide into which light is coupled from the grating coupler can be monitored and maximized while the refractive index of the PCM 1250 is controlled.

Electrical Configurations for Controlling Active Optical Waveguide Couplers

FIG. 15A depicts an active optical waveguide 1510 having a plurality of PCM islands 1550 formed on the waveguide. The waveguide 1510 may be part of a resonant structure (e.g., a micro-ring resonator, a resonant cavity) or part of an interferometric device (e.g., a Mach-Zehnder interferometer). For the illustrated example, the PCM islands 1550 can be heated by underlying doped semiconductor 1520 (e.g., silicon) which may form part of the waveguide 1510. The doping of the semiconductor may have a lower concentration near the waveguide than farther away from the waveguide. For example, n-doped semiconductor 1520 at and/or near the waveguide 1510 may electrically connect to n++ doped semiconductor 1524 that electrically connects to metal contacts or interconnects 1265, which can carry current to and from the n++ and n-doped regions. The lower concentration of dopant can localize heating to the region containing the PCM islands 1550. In some implementations, the doping under the PCM islands 1550 may be patterned such that there are doped semiconductor sections directly under each PCM island separated by undoped sections of the semiconductor. Lithographically adjustable features for the implementation of FIG. 15A include the spacing and duty cycle of the PCM islands 1550. The PCM islands 1550 can be used for potentially localized index modification, enhanced light-matter interaction, optimal optical and/or thermal modulation, programmable optical tuning, etc.

P-type doping may be used in some implementations instead of, or in addition to, n-type doping. When combined with n-type doping, a p-n junction or p-i-n junction may be formed laterally or vertically across the waveguide 1510. To heat the PCM islands 1550, the p-n junction can be forward biased. The doped regions of the semiconductor layer(s) may have any suitable shape that localizes heating to a region in the immediate vicinity of the PCM (e.g., within 10 microns of the PCM).

Heating of the PCM islands 1550 can induce a change in the refractive index of the PCM islands, which can locally change the effective refractive index of the waveguide 1510. The change in the effective index of the waveguide changes the optical pathlength of the waveguide and the resonant or interferometric characteristics of a resonant or interferometric device into which the waveguide 1510 may be incorporated.

FIG. 15B depicts an alternative design of an active optical waveguide 1510. For this implementation, a PCM strip 1551 is formed along the waveguide and can be heated to change optical characteristics (refractive index, optical path length) of the waveguide 1510. The PCM strip 1551 may be easier to pattern lithographically and induce more change in the effective refractive index of the waveguide 1510 than the PCM islands 1550 of FIG. 15A. On the other hand, the approach shown in FIG. 15A allows localized optical and/or thermal modulation of the optical component.

FIG. 16A and FIG. 16B depict electrical configurations that may be implemented with the PCM islands 1550 or a PCM strip 1551 of FIG. 15A or FIG. 15B. The integrated components in FIG. 15A and FIG. 15B may be covered with a passivating, cap, or cladding layer 1130, and conductive vias 1260 can be formed in the layer to provide electrical connection to the contact pads or metal interconnects 1265. In some cases, one or more third conductive vias 1261 can be formed to electrically contact the PCM island(s) 1550 or PCM strip 1551 (referred to collectively as PCM 1650 in FIG. 16A through FIG. 17C). Electrical current can be carried through the third conductive via 1261 to heat the PCM 1650 and/or to sense a change in resistance (and thereby monitor a phase state) of the PCM 1650. The contact area of the third via 1261 at the PCM 1650 may be smaller than the area of the PCM, so that partial phase transition of the PCM can be implemented (as described above in connection with FIG. 1D). If bi-state switching of the PCM is desired, the contact area of the third via 1261 at the PCM may be essentially the same size as the PCM's lateral area. FIG. 16B depicts a similar electrical configuration wherein the $n^{++}$-n-$n^{++}$ doping of the semiconductor is replaced with $n^{++}$-n-p-$p^{++}$ doping to form a p-n junction or p-i-n junction laterally across the waveguide 1510.

FIG. 17A, FIG. 17B, and FIG. 17C depict modes of operation of an active waveguide for the electrical configurations of FIG. 16A and FIG. 16B. In FIG. 17A a larger heating current 1705 $i_h$ can be carried in either direction between the two outer conductive vias 1260 to heat and induce phase transition in the PCM 1650. An optical mode 1710 can propagate in the waveguide and sense the PCM transition (e.g., via a phase change that affects an output of an interferometer into which the waveguide 1510 is incorporated). In this regard, the optical mode can read out the phase state of the PCM 1650. Alternatively, a smaller sensing electrical current 1702 is can flow through the third electrode 1261 in either direction to sense a phase state of the PCM 1650. The ratio $i_h/i_s$ can be greater than 2:1. Since the PCM is stable in either phase state, the PCM 1650 of the embodiments of FIG. 15A through FIG. 17C may serve as memory elements for computing, data-storage, and/or machine-learning applications. The amount of energy needed to switch between states can be between 1 pJ and 500 µJ. The ability to read out the memory (phase state of the PCM 1650) in two different ways (electrically and optically) may provide enhanced memory functionality. For example, multi-level (rather than binary) memory may be implemented with various steps of phase transition between fully amorphous and fully crystalline.

As depicted in FIG. 17B, the heating current 1705 to write a phase state of the PCM 1650 can alternatively or additionally flow through the third conductive via 1261 and either or both of the outer conductive vias 1260, in either direction. Providing current through the third conductive via 1261 may induce partial phase transition in the PCM 1650 more effectively than the configuration of FIG. 17A. The optical mode 1710 can sense discrete or continuous changes in effective index of the waveguide 1710. A sensing current is can also be applied to read out the phase state of the PCM 1650 as described above.

FIG. 17C depicts an embodiment where an optical heating pulse 1712 that is absorbed by the PCM 1650 and/or waveguide 1510 is used to heat and induce phase transition in the PCM. The heating pulse 1712 may be provided through the waveguide 1510. Accordingly, there can be at least three different ways to write the phase state of the PCM: flowing heating current between outer conductive vias 1260 as shown in FIG. 17A, flowing current through the third conductive via 1261 as shown in FIG. 17B, and heating with the optical heating pulse 1712. Of course, combinations of these writing techniques may be implemented. The sensing current 1702 may be used to sense the phase state of the PCM 1650. Alternatively or additionally, an optical mode 1710 may be propagated in the waveguide 1510 concurrently with, or after, the optical heating pulse 1712 to sense the phase state of the PCM 1650. The optical mode 1710 for reading the PCM may have a different wavelength than the wavelength of the heating pulse 1712.

Various configurations of optical elements and meta-atoms that include PCM are possible. Some example configurations are listed below.

(1) A tunable meta-lens comprising: a substrate; a first array of meta-atoms comprising first phase-change material and disposed on the substrate; and a first heater, in thermal communication with the first array of meta-atoms, to heat the first array of meta-atoms, thereby changing the first phase-change material, at least in part, between an amorphous state with a first refractive index and a crystalline state with a second refractive index different from the first refractive index by at least 0.1, the change between the amorphous state and the crystalline state changing at least a portion of a wavefront of an optical beam passing through the tunable meta-lens.

(2) The tunable meta-lens of configuration (1), wherein each meta-atom in the first array of meta-atoms has at least one transverse dimension less than a design wavelength of the tunable meta-lens.

(3) The tunable meta-lens of configuration (1) or (2), wherein the first array of meta-atoms comprises meta-atoms of different shapes.

(4) The tunable meta-lens of any one of configurations (1) through (3), wherein the change between the amorphous state and the crystalline state changes a focal length of the tunable meta-lens for the optical beam.

(5) The tunable meta-lens of any one of configurations (1) through (4), wherein the change between the amorphous state and the crystalline state changes an effective aperture of the tunable meta-lens or of an optical system containing the tunable meta-lens for the optical beam.

(6) The tunable meta-lens of any one of configurations (1) through (5), wherein the first array of meta-atoms is disposed on a first side of the substrate, and further comprising: a second array of meta-atoms formed of second phase-change material and disposed on a second side of the substrate opposite the first side of the substrate.

(7) The tunable meta-lens of configuration (6), further comprising: a second heater, in thermal communication with the second array of meta-atoms, to heat the second array of meta-atoms, thereby changing the second phase-change material, at least in part, between the amorphous state and the crystalline state thereby further changing the wavefront of the optical beam.

(8) The tunable meta-lens of configuration (6) or (7), wherein a parfocal zoom of the tunable meta-lens is configured to change from a factor of 1 to 50 in response to changing the phase state of the first phase-change material and the second phase-change material.

(9) The tunable meta-lens of any one of configurations (6) through (8), further comprising: an imaging device located at an image plane of the tunable meta-lens; and a material other than air filling most of a space between the tunable meta-lens and the imaging device.

Various methods of using PCM in photonic applications are possible. Some example methods are listed below.

(10) A method of testing a photonic integrated circuit comprising a first waveguide evanescently coupled to a second waveguide coated with a layer of phase-change material reversibly switchable, at least in part, between an amorphous state with a first refractive index and a crystalline state with a second refractive index higher than the first refractive index by at least 0.1, the method comprising: coupling light into the first waveguide; switching the layer of phase-change material, at least in part, between the amorphous state and the crystalline state to increase a coupling ratio from the first waveguide to the second waveguide; detecting light coupled into the second waveguide from the first waveguide; and switching the layer of phase-change material, at least in part, between the amorphous state and the crystalline state to decrease the coupling ratio from the first waveguide to the second waveguide.

(11) The method of (10), wherein switching the layer of phase-change material, at least in part, between the amorphous state and the crystalline state to increase the coupling ratio between the first waveguide and the second waveguide comprises switching the layer of phase-change material from the crystalline state to the amorphous state.

(12) The method of (10) or (11), wherein an insertion loss of the second waveguide is between 0.005 dB and 0.04 dB due to the presence of the first waveguide when the phase the phase-change material is switched to decrease coupling between the first waveguide and the second waveguide.

(13) The method of any one of (10) through (11), further comprising: determining at least one of an optical reflection or an optical transmission of the photonic integrated circuit based on the light coupled into the second waveguide.

Additional configurations of waveguides that include PCM are possible. Some example configurations are listed below. Such waveguides may be used with method implementations (10) through (13) above.

(14) An apparatus comprising: a substrate; a waveguide integrated with the substrate; a layer of optical phase-change material disposed on the waveguide; and a doped silicon heater, integrated with the substrate, to heat the layer of optical phase-change material, thereby switching the layer of optical phase-change material, at least in part, between an amorphous phase and a crystalline phase.

(15) The apparatus of configuration (14), wherein the doped silicon heater comprises: a first doped region in the substrate; a second doped region in the substrate in electrical communication with the waveguide via the first doped region; a first electrical contact in electrical communication with the first doped region; and a second electrical contact in electrical communication with the second doped region.

(16) The apparatus of configuration (15), further comprising: a third electrical contact, in electrical communication with the layer of optical phase-change material, to measure a resistance of the layer of optical phase material and/or to switch the layer of optical phase-change material, at least in part, between the amorphous phase and the crystalline phase.

(17) The apparatus of configuration (15) or (16), further comprising: a light source, in optical communication with the waveguide, to detect a change in an optical characteristic of the waveguide and/or to switch the layer of optical phase-change material, at least in part, between the amorphous phase and the crystalline phase.

(18) The apparatus of any one of configurations (15) through (17), wherein the first doped region is n+ doped or n++ doped, the second doped region is n+ doped or n++ doped, and the waveguide is n doped.

(19) The apparatus of any one of configurations (15) through (17), wherein the first doped region is p+ doped or p++ doped, the second doped region is p+ doped or p++ doped, and the waveguide is p doped.

(20) The apparatus of any one of configurations (15) through (17), wherein the first doped region is n+ doped or n++ doped, the second doped region is p+ doped or p++ doped, and a p-n or p-i-n junction is formed laterally across the waveguide.

(21) The apparatus of any one of configurations (14) through (20), wherein the doped silicon heater comprises: a first doped region in the substrate; a second doped region forming at least part of the waveguide; a first electrical contact in electrical communication with the first doped region; and a second electrical contact in electrical communication with the layer of optical phase-change material.

Various methods of using PCM in photonic applications with tunable optical gratings are possible. Some example methods are listed below.

(22) A method of making a tunable optical grating, the method comprising: depositing a layer of phase-change material on a substrate; etching an optical grating pattern into the layer of optical phase-change material to form grating teeth separated by spaces; forming electrodes on opposite sides of the grating teeth.

(23) The method (22), wherein etching the optical grating pattern into the layer of phase-change material further comprises etching the optical grating pattern into the substrate beneath the layer of phase-change material.

(24) The method of (22) or (23), further comprising: depositing a dielectric layer over the optical grating pattern, and wherein forming the electrodes on the opposite sides of the grating teeth comprises forming holes for the electrodes through the dielectric layer.

(25) The method of any one of (22) through (23), further comprising doping the substrate to form an integrated heater.

(26) The method of (25), wherein doping the substrate comprises forming a spatially varying doping profile under the optical grating pattern.

(27) The method of any one of (22) through (26), further comprising doping the grating teeth to form an integrated heater.

(28) The method of (27), wherein doping the grating teeth comprises doping different grating teeth differently.

(29) The method of any one of (22) through (28), further comprising: forming independently controllable heaters under different grating teeth, the independently controllable heaters configured to locally heat one or more teeth of the tunable optical grating and controllably adjust at least an effective real refractive index of a portion of the tunable optical grating at which the one or more teeth are located.

(30) The method of any one of (22) through (29), further comprising: at least partially inducing a phase change in the optical phase-change material by illuminating the optical phase-change material.

(31) The method of any one of (22) through (30), further comprising: at least partially inducing a phase change in the optical phase-change material by injecting current through at least a portion of the tunable grating.

Additional configurations of optical elements that include PCM are possible. Some example configurations are listed below. Such optical elements may be used with configurations (1) through (9) above.

(32) An optical element comprising: a substrate having a surface; a first meta-atom formed from a first material on the surface of the substrate, the first meta-atom having a first three-dimensional structure with at least one maximum transverse dimension, in a direction parallel to the surface of the substrate, less than a wavelength of light for which the optical element is designed to operate on; first phase change material adjacent to the first material of the first meta-atom; and a first heating element to heat the first phase change material thereby changing the first phase-change material, at least in part, between an amorphous state with a first refractive index and a crystalline state with a second refractive index different from the first refractive index by at least 0.1.

(33) The optical element of configuration (32), wherein the first phase change material and the first heating element are formed as part of the meta-atom.

(34) The optical element of configuration (32) or (33), further comprising: a second meta-atom formed from the first material on the surface of the substrate, the second meta-atom having a second three-dimensional structure with at least one maximum transverse dimension, in a direction parallel to the surface of the substrate, less than the wavelength of light for which the optical element is designed to operate on; second phase change material adjacent to the first material of the second meta-atom; and a second heating element to heat the second phase change material thereby changing the second phase-change material, at least in part, between the amorphous state with the first refractive index and the crystalline state with a second refractive index, wherein the first heating element and the second heating element are pixelated to be controlled independently of each other.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A tunable meta-lens comprising:
   a substrate;
   a first array of meta-atoms disposed on the substrate, wherein the first array of meta-atoms includes a plurality of meta-atoms, each meta-atom of the plurality of meta-atoms being formed from a first material;
   a first phase-change material disposed adjacent to the first material of each meta-atom of the plurality of meta-atoms; and
   a first heater, in thermal communication with the first array of meta-atoms, to heat the first array of meta-atoms, thereby changing the first phase-change material, at least in part, between an amorphous state with a first refractive index and a crystalline state with a second refractive index different from the first refractive index by at least 0.1, the change between the amorphous state and the crystalline state changing at least a portion of a wavefront of an optical beam passing through the tunable meta-lens.

2. The tunable meta-lens of claim 1, wherein each meta-atom in the first array of meta-atoms has at least one transverse dimension less than a design wavelength of the tunable meta-lens.

3. The tunable meta-lens of claim 1, wherein the first array of meta-atoms comprises meta-atoms of different shapes.

4. The tunable meta-lens of claim 1, wherein the change between the amorphous state and the crystalline state changes a focal length of the tunable meta-lens for the optical beam.

5. The tunable meta-lens of claim 1, wherein the change between the amorphous state and the crystalline state changes an effective aperture of the tunable meta-lens or of an optical system containing the tunable meta-lens for the optical beam.

6. The tunable meta-lens of claim 1, wherein the first array of meta-atoms is disposed on a first side of the substrate, and further comprising:
a second array of meta-atoms formed of second phase-change material and disposed on a second side of the substrate opposite the first side of the substrate.

7. The tunable meta-lens of claim 6, further comprising:
a second heater, in thermal communication with the second array of meta-atoms, to heat the second array of meta-atoms, thereby changing the second phase-change material, at least in part, between the amorphous state and the crystalline state thereby further changing the wavefront of the optical beam.

8. The tunable meta-lens of claim 6, wherein a parfocal zoom of the tunable meta-lens is configured to change from a factor of 1 to 50 in response to changing a phase state of the first phase-change material and the second phase-change material.

9. The tunable meta-lens of claim 6, further comprising:
an imaging device located at an image plane of the tunable meta-lens; and
a material other than air filling most of a space between the tunable meta-lens and the imaging device.

10. The tunable meta-lens of claim 1, wherein the first meta-atom is further formed in part from the first phase-change material.

11. An optical element comprising:
a substrate having a surface;
a first meta-atom formed from a first material on the surface of the substrate, the first meta-atom having a first three-dimensional structure with at least one maximum transverse dimension, in a direction parallel to the surface of the substrate, less than a wavelength of light for which the optical element is designed to operate on;
first phase-change material adjacent to the first material of the first meta-atom; and
a first heating element to heat the first phase-change material thereby changing the first phase-change material, at least in part, between an amorphous state with a first refractive index and a crystalline state with a second refractive index different from the first refractive index by at least 0.1.

12. The optical element of claim 11, wherein the first phase-change material and the first heating element are formed as part of the meta-atom.

13. The optical element of claim 11, further comprising:
a second meta-atom formed from the first material on the surface of the substrate, the second meta-atom having a second three-dimensional structure with at least one maximum transverse dimension, in a direction parallel to the surface of the substrate, less than the wavelength of light for which the optical element is designed to operate on;
second phase-change material adjacent to the first material of the second meta-atom; and
a second heating element to heat the second phase-change material thereby changing the second phase-change material, at least in part, between the amorphous state with the first refractive index and the crystalline state with a second refractive index, wherein the first heating element and the second heating element are pixelated to be controlled independently of each other.

14. A tunable meta-lens comprising:
a substrate;
a first array of meta-atoms comprising first phase-change material and disposed on a first side of the substrate;
a second array of meta-atoms formed of second phase-change material and disposed on a second side of the substrate opposite the first side of the substrate; and
a first heater, in thermal communication with the first array of meta-atoms, to heat the first array of meta-atoms, thereby changing the first phase-change material, at least in part, between an amorphous state with a first refractive index and a crystalline state with a second refractive index different from the first refractive index by at least 0.1, the change between the amorphous state and the crystalline state changing at least a portion of a wavefront of an optical beam passing through the tunable meta-lens, wherein a parfocal zoom of the tunable meta-lens is configured to change from a factor of 1 to 50 in response to changing a phase state of the first phase-change material and the second phase-change material.

15. The tunable meta-lens of claim 14, wherein each meta-atom in the first array of meta-atoms has at least one transverse dimension less than a design wavelength of the tunable meta-lens.

16. The tunable meta-lens of claim 14, wherein the first array of meta-atoms comprises meta-atoms of different shapes.

17. The tunable meta-lens of claim 14, wherein the change between the amorphous state and the crystalline state changes a focal length of the tunable meta-lens for the optical beam.

18. The tunable meta-lens of claim 14, wherein the change between the amorphous state and the crystalline state changes an effective aperture of the tunable meta-lens or of an optical system containing the tunable meta-lens for the optical beam.

19. The tunable meta-lens of claim 14, further comprising:
a second heater, in thermal communication with the second array of meta-atoms, to heat the second array of meta-atoms, thereby changing the second phase-change material, at least in part, between the amorphous state and the crystalline state thereby further changing the wavefront of the optical beam.

20. The tunable meta-lens of claim 14, further comprising:
an imaging device located at an image plane of the tunable meta-lens; and
a material other than air filling most of a space between the tunable meta-lens and the imaging device.

21. The tunable meta-lens of claim 14, wherein at least two meta-atoms of the first array of meta-atoms are each formed in part from the first phase-change material.

22. A tunable meta-lens comprising:
a substrate;
a first array of meta-atoms comprising first phase-change material and disposed on a first side of the substrate;
a second array of meta-atoms formed of second phase-change material and disposed on a second side of the substrate opposite the first side of the substrate;
an imaging device located at an image plane of the tunable meta-lens;

a material other than air filling most of a space between the tunable meta-lens and the imaging device; and a first heater, in thermal communication with the first array of meta-atoms, to heat the first array of meta-atoms, thereby changing the first phase-change material, at least in part, between an amorphous state with a first refractive index and a crystalline state with a second refractive index different from the first refractive index by at least 0.1, the change between the amorphous state and the crystalline state changing at least a portion of a wavefront of an optical beam passing through the tunable meta-lens.

23. The tunable meta-lens of claim 22, wherein each meta-atom in the first array of meta-atoms has at least one transverse dimension less than a design wavelength of the tunable meta-lens.

24. The tunable meta-lens of claim 22, wherein the first array of meta-atoms comprises meta-atoms of different shapes.

25. The tunable meta-lens of claim 22, wherein the change between the amorphous state and the crystalline state changes a focal length of the tunable meta-lens for the optical beam.

26. The tunable meta-lens of claim 22, wherein the change between the amorphous state and the crystalline state changes an effective aperture of the tunable meta-lens or of an optical system containing the tunable meta-lens for the optical beam.

27. The tunable meta-lens of claim 22, wherein the first array of meta-atoms is disposed on a first side of the substrate, and further comprising:

a second array of meta-atoms formed of second phase-change material and disposed on a second side of the substrate opposite the first side of the substrate.

28. The tunable meta-lens of claim 27, further comprising:

a second heater, in thermal communication with the second array of meta-atoms, to heat the second array of meta-atoms, thereby changing the second phase-change material, at least in part, between the amorphous state and the crystalline state thereby further changing the wavefront of the optical beam.

29. The tunable meta-lens of claim 27, wherein a parfocal zoom of the tunable meta-lens is configured to change from a factor of 1 to 50 in response to changing a phase state of the first phase-change material and the second phase-change material.

30. The tunable meta-lens of claim 22, wherein at least two meta-atoms of the first array of meta-atoms are each formed in part from the first phase-change material.

31. An optical element comprising:

a substrate having a surface;

a first meta-atom formed from a first material on the surface of the substrate, the first meta-atom having a first three-dimensional structure with at least one maximum transverse dimension, in a direction parallel to the surface of the substrate, less than a wavelength of light for which the optical element is designed to operate on;

first phase-change material adjacent to the first material of the first meta-atom;

a first heating element to heat the first phase-change material thereby changing the first phase-change material, at least in part, between an amorphous state with a first refractive index and a crystalline state with a second refractive index different from the first refractive index by at least 0.1;

a second meta-atom formed from the first material on the surface of the substrate, the second meta-atom having a second three-dimensional structure with at least one maximum transverse dimension, in a direction parallel to the surface of the substrate, less than the wavelength of light for which the optical element is designed to operate on;

second phase-change material adjacent to the first material of the second meta-atom; and a second heating element to heat the second phase-change material thereby changing the second phase-change material, at least in part, between the amorphous state with the first refractive index and the crystalline state with a second refractive index, wherein the first heating element and the second heating element are pixelated to be controlled independently of each other.

32. The optical element of claim 31, wherein the first phase-change material and the first heating element are formed as part of the meta-atom.

* * * * *